US008065612B2

(12) United States Patent
Ono et al.

(10) Patent No.: US 8,065,612 B2
(45) Date of Patent: Nov. 22, 2011

(54) DISPLAY SYSTEM, DISPLAY METHOD AND DISPLAY PROGRAM

(75) Inventors: Shuji Ono, Kanagawa (JP); Hiroshi Yamaguchi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1162 days.

(21) Appl. No.: 11/798,706

(22) Filed: May 16, 2007

(65) Prior Publication Data

US 2007/0271213 A1    Nov. 22, 2007

(30) Foreign Application Priority Data

May 16, 2006  (JP) .................. 2006-135919
Apr. 19, 2007  (JP) .................. 2007-110950

(51) Int. Cl.
*G06F 17/00* (2006.01)
*G06F 17/30* (2006.01)

(52) U.S. Cl. ................. 715/273; 715/200; 707/781
(58) Field of Classification Search .......... 707/758, 707/781, 783, 787; 715/200, 255, 273, 700, 715/741

See application file for complete search history.

(56) References Cited

U.S. PATENT DOCUMENTS

| 4,196,431 | A  | * | 4/1980  | Lee ................................ 345/18 |
| 6,167,436 | A  | * | 12/2000 | Yamane et al. ............... 709/213 |
| 6,703,734 | B2 | * | 3/2004  | Hakamata et al. .............. 310/90 |
| 7,058,696 | B1 | * | 6/2006  | Phillips et al. ............... 709/217 |
| 7,171,420 | B2 | * | 1/2007  | Iyer et al. ..................... 1/1 |
| 7,395,396 | B2 | * | 7/2008  | Takahashi et al. ............ 711/165 |
| 2005/0207727 | A1 | * | 9/2005  | Hirose et al. ................. 386/46 |
| 2006/0166681 | A1 | * | 7/2006  | Lohbihler ................. 455/456.2 |

* cited by examiner

*Primary Examiner* — Tony Mahmoudi
*Assistant Examiner* — I Uddin
(74) *Attorney, Agent, or Firm* — Sughrue Mion, PLLC

(57) ABSTRACT

There is provided a display system including a display apparatus and an information processing apparatus. The display apparatus includes a file identifier storing section that stores thereon a file identifier, a display's communicating section that transmits the file identifier to the information processing apparatus, and receives file data, and a display section that displays thereon the file data. The information processing apparatus includes a file data obtaining section that obtains the file data identified by the file identifier, and transmits the obtained file data to the display apparatus, a file data opening control section that opens the file data to enable the user to edit or view the file data, and a file data closing control section that closes the file data to prohibit the user from editing or viewing the file data, when no access is made to the file data for a predetermined time period.

13 Claims, 18 Drawing Sheets

2140

| FILE IDENTIFIER | DISPLAY APPARATUS | EDITING/VIEWING RIGHT | | | | |
|---|---|---|---|---|---|---|
| | | VIEWING | SAVING | PRINTING | REWRITING | ... |
| FILE IDENTIFIER 3001 | PRESENT | ○ | ○ | ○ | ○ | ... |
| | ABSENT | ○ | × | × | × | ... |
| FILE IDENTIFIER 3002 | PRESENT | ○ | ○ | × | × | |
| | ABSENT | × | × | × | × | |
| FILE IDENTIFIER 3003 | PRESENT | ○ | × | × | ○ | |
| | ABSENT | ○ | ... | ... | × | |
| ... | ... | | | | | |

| FILE IDENTIFIER | PERMITTED APPARATUSES |
|---|---|
| FILE IDENTIFIER 4001 | 192.168.10.2, 192.168.10.12 |
| FILE IDENTIFIER 4002 | 192.168.10.14, 192.168.10.19 |
| FILE IDENTIFIER 4003 | 192.168.10.22, 192.168.10.25 |
| ⋮ | ⋮ |

FIG. 10

DISPLAY SYSTEM, DISPLAY METHOD AND DISPLAY PROGRAM

CROSS REFERENCE TO RELATED APPLICATION

The present application relates to and claims priority from Japanese Patent Applications No. 2006-135919 filed on May 16, 2006 and No. 2007-110950 filed on Apr. 19, 2007, the contents of which are incorporated herein by reference for all purpose.

BACKGROUND

1. Technical Field

The present invention relates to a display system, a display method and a display program. More particularly, the present invention relates to a display system, a display method and a display program which manage file data editing and viewing by a user.

2. Related Art

A content distribution system has been proposed which is constituted by electronic paper having therein a tag storing a medium ID identifying the electronic paper and a distribution managing apparatus which distributes contents to the electronic paper as disclosed in Unexamined Japanese Patent Application Publication No. 2006-41801, for example. Specifically speaking, the distribution managing apparatus reads the medium IDs stored on the tags of a plurality of pieces of electronic paper, and determines contents to be distributed to each of the plurality of pieces of electronic paper. Subsequently, the distribution managing apparatus transmits the determined contents to each of the plurality of pieces of electronic paper, and each piece of electronic paper displays thereon the received contents. Other than this system, a document processing system has been proposed as disclosed in Unexamined Japanese Patent Application Publication No. 2005-327159, for example. The document processing system reads a document ID identifying a document, from electronic paper that displays thereon the document and includes a storing section storing thereon the document ID, and causes a predetermined output apparatus (a printer, a terminal or the like) to output document data corresponding to the read document ID.

According to the invention disclosed in the publication No. 2006-41801, however, the distribution managing apparatus only distributes contents to the electronic paper, and therefore can not enable a user to edit file data which is, for example, the contents, displayed on the electronic paper, even when the user desires to edit the file data. On the other hand, the invention disclosed in the publication No. 2005-327159 can receive the identifier identifying the file data displayed on the electronic paper, and output the file data identified by the received identifier to the printer or the like. However, this invention has no limitation on the editing of the file data, and thus may not be capable of protecting the confidentiality of the file data.

In view of the above, an advantage of some embodiments of the present invention is to provide a display system, a display method and a display program which can solve the above-mentioned problems. This advantage is achieved by combining the features recited in the independent claims. The dependent claims define further effective specific examples of the present invention.

SUMMARY

To solve the above-mentioned problems, a first embodiment of the present invention is a display system including a display apparatus that displays thereon file data, and a first information processing apparatus that manages editing or viewing of the file data by a user. Here, the display apparatus includes a file identifier storing section that stores thereon a file identifier identifying the file data, a display's communicating section that transmits the file identifier stored on the file identifier storing section to the first information processing apparatus, and receives the file data identified by the file identifier stored on the file identifier storing section, and a display's display section that displays thereon the file data received by the display's communicating section. The first information processing apparatus includes a first file data obtaining section that obtains the file data identified by the file identifier transmitted from the display's communicating section, and transmits the obtained file data to the display apparatus, a first file data opening control section that opens the file data obtained by the first file data obtaining section to enable the user to edit or view the file data, and a first file data closing control section that closes the file data which has been opened by the first file data opening control section to prohibit the user from editing or viewing the file data, when no access is made to the file data which has been opened by the first file data opening control section for a predetermined first time period.

When the first file data opening control section opens the file data obtained by the first file data obtaining section to enable the user to edit and view the file data, the first file data closing control section may set a status of the file data which has been opened by the first file data opening control section to a read-only status in order to prohibit the user from editing the file data, if no access is made to the file data which has been opened by the first file data opening control section for a predetermined second time period which is shorter than the first time period. The first information processing apparatus may further include a processing's communicating section that receives the file identifier which is stored on the file identifier storing section and transmitted from the display's communicating section, the display's communicating section may transmit the file identifier stored on the file identifier storing section at intervals of a predetermined third time period, and the first file data closing control section may close the file data which has been opened by the first file data opening control section if the processing's communicating section does not receive the file identifier from the display's communicating section for a predetermined fourth time period which is longer than the third time period.

The display apparatus may be electronic paper which keeps the file data visibly displayed thereon without power supply. The display apparatus may further include an update storing section that stores thereon an update date and an update time of the file data displayed on the display's display section, the display's communicating section may further transmit the update date and time stored on the update storing section to the first information processing apparatus, the first information processing apparatus may further include an update judging section that judges whether the file data displayed on the display's display section has been updated, with reference to the update date and time which are transmitted from the display's communicating section and an update date and an update time of the file data which are obtained by the first file data obtaining section, and an update notifying section that, when the update judging section judges that the file data has been updated, supplies, to the display apparatus, update information indicating that the file data displayed on the display's display section has been updated, and the display's display section may display thereon the update information supplied by the update notifying section.

The file identifier storing section may store thereon the file identifier identifying the file data that indicates an electronic medical record of a patient, the display's communicating section may transmit the file identifier stored on the file identifier storing section to the first information processing apparatus, and receive the file data that indicates the electronic medical record which is identified by the file identifier stored on the file identifier storing section, and the display's display section may display thereon the file data that indicates the electronic medical record which is received from the display's communicating section. The display system may further include a power feeding apparatus that generates a magnetic field within a predetermined range so as to feed power to the display apparatus. Here, the display apparatus may further include a power receiving section that receives the power from the magnetic filed generated by the power feeding apparatus, and when the display apparatus is placed within the predetermined range and the power receiving section receives the power, the display's communicating section may use the received power to transmit the file identifier stored on the file identifier storing section to the first information processing apparatus and receive the file data identified by the file identifier stored on the file identifier storing section.

The first information processing apparatus may further include an information input section that receives a file identifier identifying file data, which is designated by the user, and an electronic paper detecting section that detects whether the file identifier transmitted from the display's communicating section is the same as the file identifier received by the information input section, and when the electronic paper detecting section detects that the file identifier transmitted from the display's communicating section is the same as the file identifier received by the information input section, the first file data opening control section may open the file data obtained by the first file data obtaining section to enable the user to edit or view the file data.

The display's communicating section may transmit the file identifier stored on the file identifier storing section to the first information processing apparatus at intervals of a predetermined time period. Here, after the first file data opening control section opens the file data, the electronic paper detecting section may detect whether the same file identifier is transmitted thereto from the display's communicating section at intervals of the predetermined time period, and when the electronic paper detecting section detects that the same file identifier is not transmitted thereto from the display's communicating section, the first file data closing control section may close the file data which has been opened by the first file data opening control section to prohibit the user from editing or viewing the file data.

The display system may further include a right storing section that stores thereon, in association with the file identifier, an editing or viewing right of the corresponding file data which is varied depending on whether the same file identifier is transmitted from the display's communicating section. Here, the first file data opening control section and first file data closing control section may respectively open and close the file data in accordance with the editing or viewing right stored on the right storing section.

The display system may further include a second information processing apparatus that manages editing or viewing of the file data by a user. Here, the second information processing apparatus may include a second file data obtaining section that obtains the file data identified by the file identifier transmitted from the display's communicating section and transmits the obtained file data to the display apparatus, a second file data opening control section that opens the file data obtained by the second file data obtaining section to enable the user to edit or view the file data, and a second file data closing control section that closes the file data which has been opened by the second file data opening control section to prohibit the user from editing or viewing the file data, when no access is made to the file data which has been opened by the second file data opening control section for the predetermined first time period, and when the second file data opening control section enables the user to edit the file data on the second information processing apparatus, the first file data closing control section may prohibit the user from editing the file data on the first information processing apparatus.

The display system may further include a permitted apparatus storing section that stores thereon, in association with the file identifier, an apparatus identifier identifying an information processing apparatus which is permitted to edit or view the file data identified by the file identifier. Here, the first file data opening control section may open the file data to enable the user to edit or view the file data, under a condition that an apparatus identifier identifying the first information processing apparatus is stored on the permitted apparatus storing section in association with the file identifier transmitted from the display's communicating section.

The first information processing apparatus may further include a processing's notifying section that, when the apparatus identifier identifying the first information processing apparatus is not stored on the permitted apparatus storing section in association with the file identifier transmitted from the display's communicating section, notifies the user that the apparatus identifier identifying the first information processing apparatus is not stored on the permitted apparatus storing section in association with the file identifier transmitted from the display's communicating section.

A second embodiment of the present invention is a display method including transmitting a file identifier identifying file data from a display apparatus to an information processing apparatus, obtaining the file data identified by the file identifier transmitted to the information processing apparatus in the file identifier transmitting, transmitting the file data obtained in the file data obtaining to the display apparatus, receiving, at the display apparatus, the file data identified by the file identifier, which is transmitted in the file data transmitting, displaying, on the display apparatus, the file data received in the file data receiving, opening, on the information processing apparatus, the file data obtained in the file data obtaining to enable a user to edit or view the file data, and closing the file data which is opened in the file data opening to prohibit the user from editing or viewing the file data, when no access is made to the file data which is opened in the file data opening for a predetermined first time period.

A third embodiment of the present invention is a display program for a display system. Here, the display system includes a display apparatus that displays thereon file data, and an information processing apparatus that manages editing or viewing of the file data by a user. Here, the display program causes the display system to function as a file identifier storing section that stores thereon a file identifier identifying the file data, a display's communicating section that transmits the file identifier stored on the file identifier storing section to the information processing apparatus, and receives the file data identified by the file identifier stored on the file identifier storing section, a display's display section that displays thereon the file data received by the display's communicating section, a file data obtaining section that obtains the file data identified by the file identifier transmitted from the display's communicating section, and transmits the obtained file data to the display apparatus, a file data opening control section that opens the file data obtained by the file data obtaining section to enable the user to edit or view the file data, and a file data closing control section that closes the file data which has been opened by the file data opening control section to prohibit the user from editing or viewing the file data, when no access is made to the file data which has been opened by the file data opening control section for a predetermined first time period.

Here, all the necessary features of the present invention are not listed in the summary. The sub-combinations of the features may become the invention.

According to the present invention, when opening file data displayed on a display apparatus, an information processing apparatus can automatically close the file data in a case where no access is made by a user to the file data for a predetermined period of time.

BRIEF DESCRIPTION OF THE DRAWINGS

FIG. 9 illustrates a data table relating to viewing and editing rights which is stored on a right storing section 2140.

FIG. 10 illustrates a data table relating to apparatus identifiers which is stored on a second processing's communicating section 2030.

DESCRIPTION OF EXEMPLARY EMBODIMENTS

Hereinafter, one aspect of the present invention will be described through some embodiments. The embodiments do not limit the invention according to the claims, and all the combinations of the features described in the embodiments are not necessarily essential to means provided by aspects of the invention.

Figure 1:
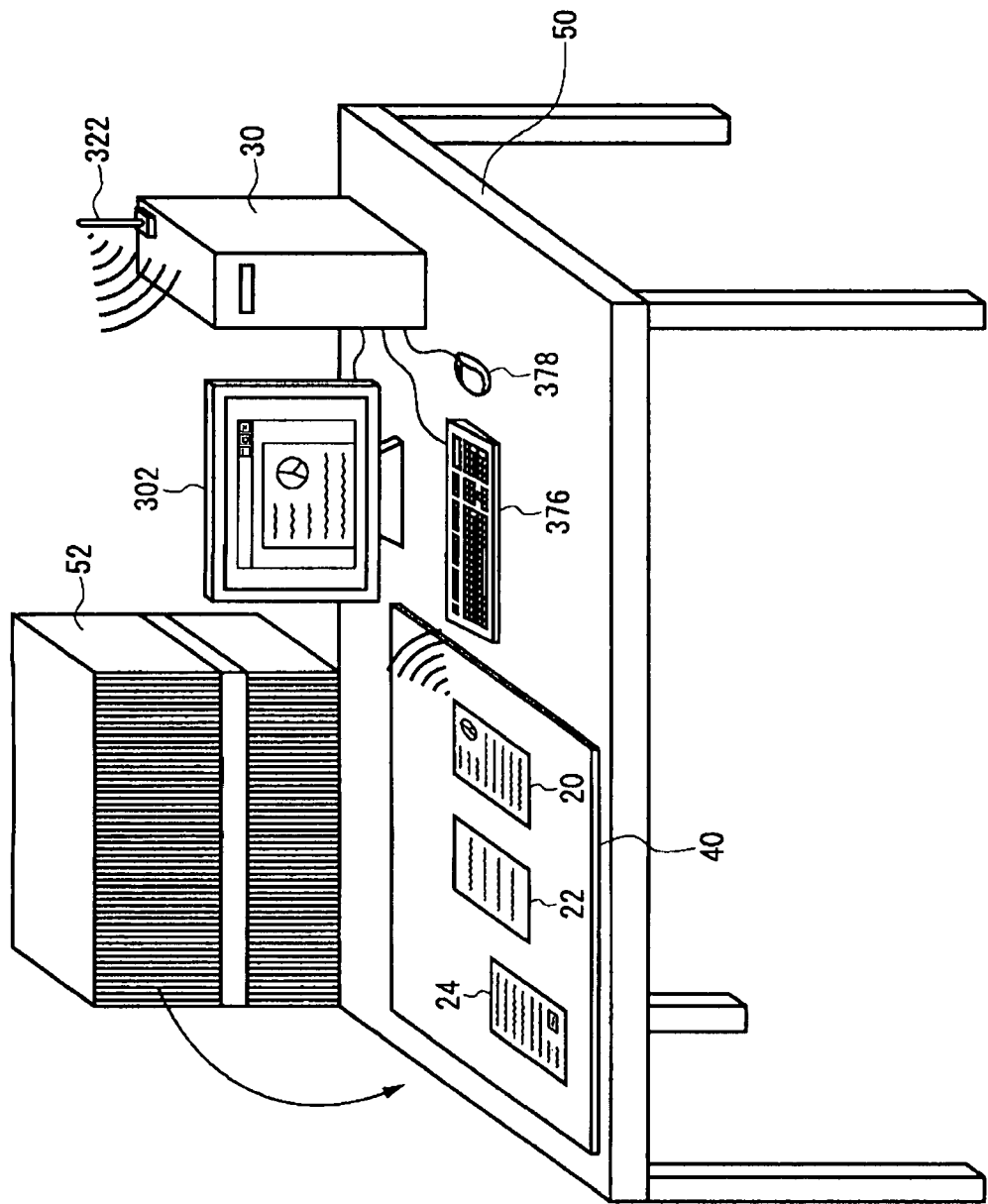
FIG. 1 is a schematic view illustrating a display system 10.

FIG. 1 is a schematic view illustrating a display system 10 relating to a first embodiment of the present invention. The display system 10 includes therein display apparatuses 20, 22 and 24, an information processing apparatus 30, and a power feeding apparatus 40. Note that the display system 10 may only require at least one display apparatus. The information processing apparatus 30 includes a monitor 302 for displaying thereon file data, and a keyboard 376 and a mouse 378 for inputting changes to be made for the file data when a user changes the file data. The display apparatuses 20, 22 and 24 may be each, for example, electronic paper, a flexible display, rewritable paper, a paper-like display, digital paper, electronic paper, an electronic sheet and an electronic display sheet.

According to the display system 10 relating to the present embodiment, when receiving power from the power feeding apparatus 40, the display apparatus 20 displaying thereon predetermined file data transmits information identifying the displayed file data to the information processing apparatus 30. The information processing apparatus 30 opens the file data identified by the received information. Here, if no access is made by a user to the file data during a predetermined period of time, the information processing apparatus 30 automatically closes the opened file data.

The display apparatuses 20, 22 and 24 each displaying thereon file data are kept in a book shelf 52, for example. The user takes the desired display apparatuses 20, 22 and 24 out of the book shelf 52, and places the display apparatuses 20, 22 and 24 on the power feeding apparatus 40 provided on a desk 50. The power feeding apparatus 40 generates a magnetic field within a predetermined range, thereby feeding power to each of the display apparatuses 20, 22 and 24. Each of the display apparatuses 20, 22 and 24 stores thereon a file identifier to identify file data displayed thereon. When receiving power from the power feeding apparatus 40, the display apparatuses 20, 22 and 24 respectively transmit the file identifiers to the information processing apparatus 30.

The information processing apparatus 30 receives the file identifiers respectively from the display apparatuses 20, 22 and 24 via an antenna 322. The information processing apparatus 30 displays on the monitor 302 the pieces of file data identified by the received file identifiers. The information processing apparatus 30 displays on the monitor 302 a plurality of pieces of file data identified by file identifiers received from a plurality of display apparatuses. The user changes the contents of the file data displayed on the monitor 302 by inputting desired information into the desired file data via the keyboard 376 and mouse 378. Subsequently, the information processing apparatus 30 transmits the file data the contents of which are changed by the user, to one of the display apparatuses 20, 22 and 24 via the antenna 322. The display apparatus 20, 22 or 24 displays thereon the changed file data which is received from the information processing apparatus 30.

Here, if the user does not access the file data identified by the file identifier received from the display apparatus 20 for a predetermined period of time, the information processing apparatus 30 sets the status of the file data to the read-only status. For example, when the user does not access the file data via the keyboard 376 or the like for the predetermined period of time, the information processing apparatus 30 sets the status of the file data to the read-only status, thereby prohibiting the change of the contents of the file data. If the user does not access the file data for another predetermined period of time, the information processing apparatus 30 closes the file data.

With the above-described configuration, the information processing apparatus 30 automatically closes the file data even when the user uses the file data opened by the information processing apparatus 30 and then stays away from the information processing apparatus 30 without closing the file data. As a result, the present embodiment can prevent a person other than the user from editing the file data.

The display apparatus 20 transmits the file identifier to the information processing apparatus 30 at intervals of a predetermined period of time. While receiving the file identifier from the display apparatus 20 at intervals of the predetermined time period, the information processing apparatus 30 keeps the file data opened which is identified by the file identifier transmitted from the display apparatus 20 to the information processing apparatus 30. When not receiving the file identifier from the display apparatus 20 for a period of time longer than the predetermined time period, the information processing apparatus 30 closes the opened file data.

With the above-described configuration, the information processing apparatus 30 can automatically close the opened file data when the user takes the display apparatus 20 away from the display system 10. As a result, the present embodiment can prevent a case where the information processing apparatus 30 leaves the file data opened and a person other than the user can thus change the contents of the file data.

Figure 2:
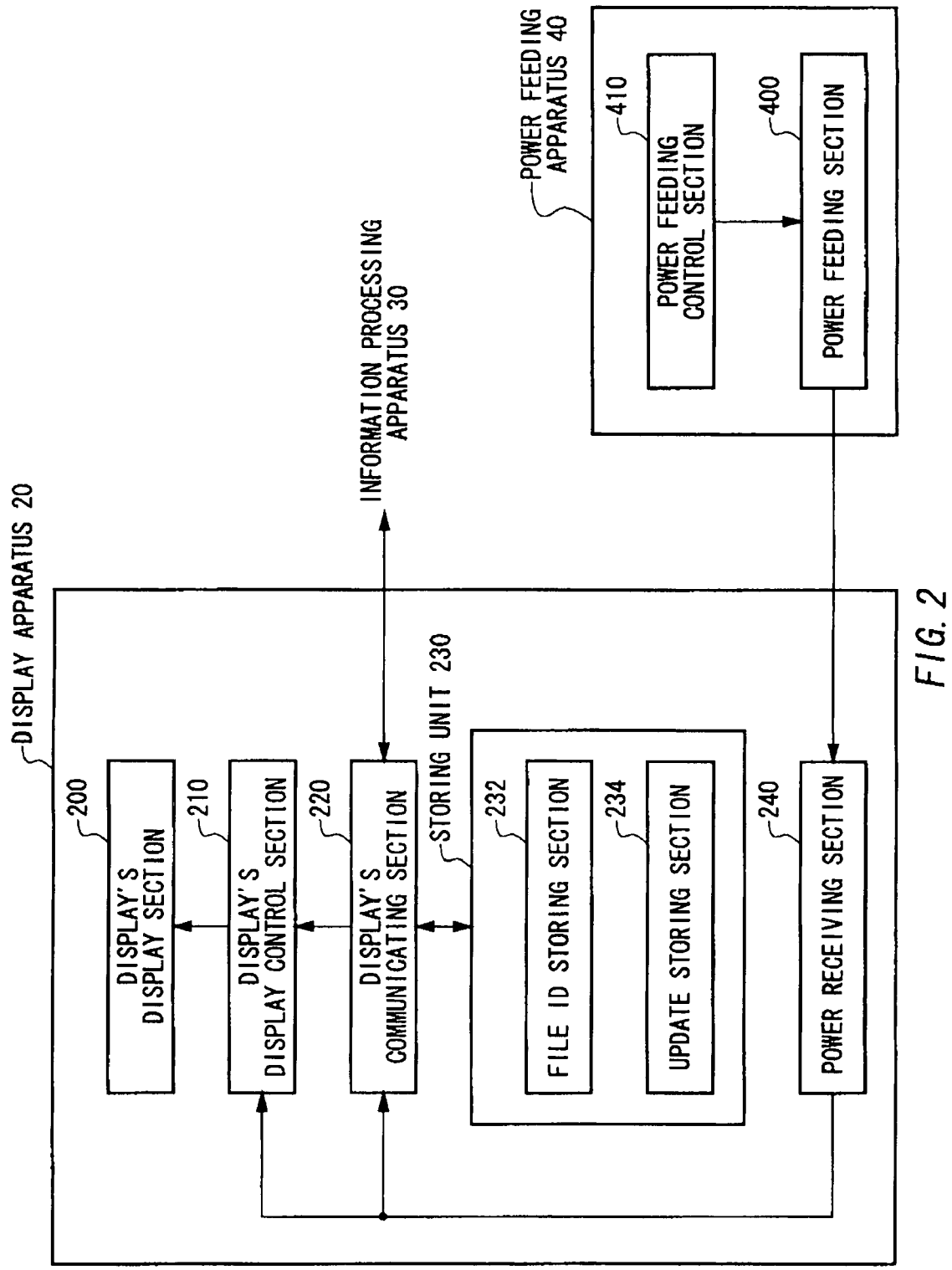
FIG. 2 illustrates the functional configurations of a display apparatus 20 and a power feeding apparatus 40.
Figure 3:
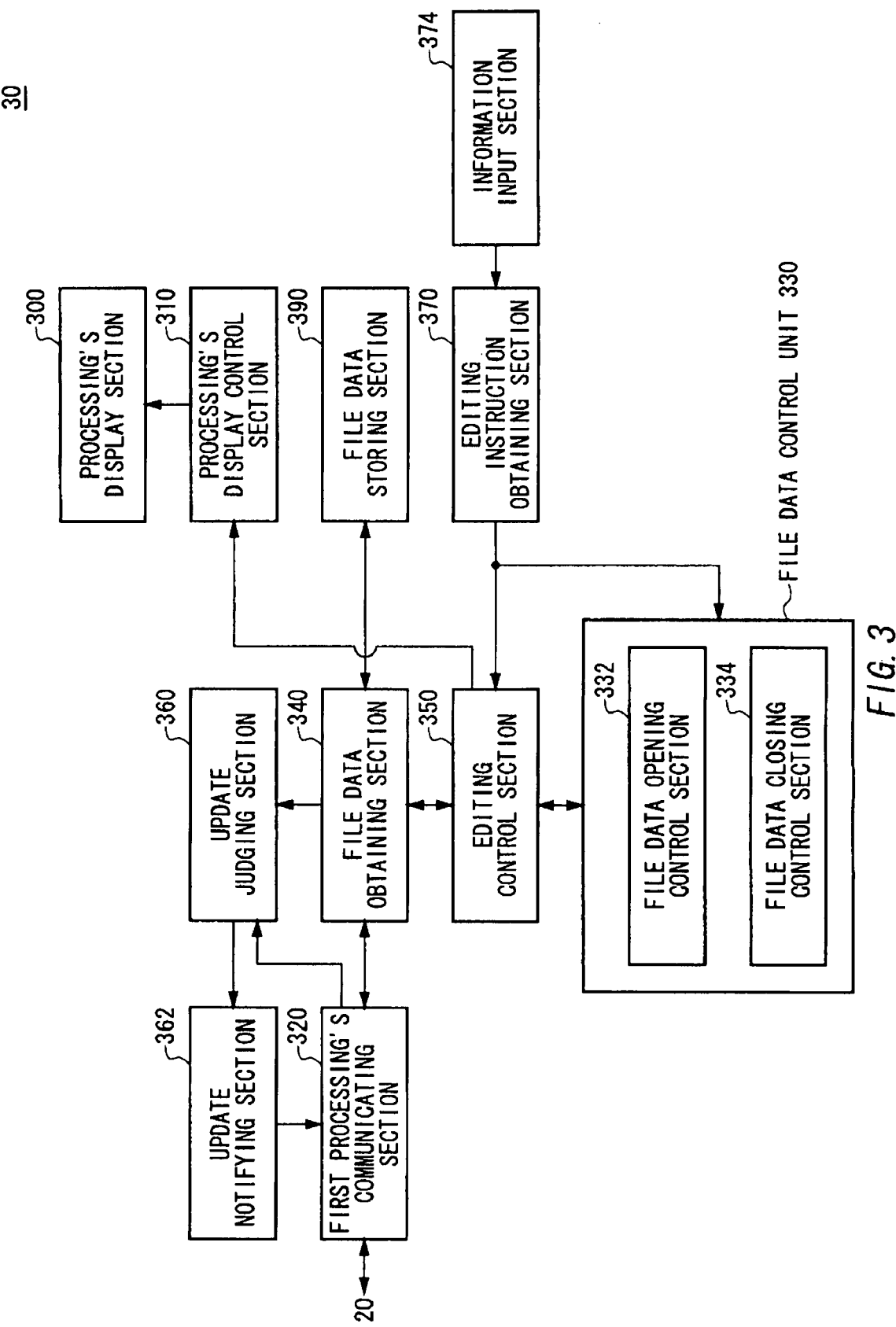
FIG. 3 illustrates the functional configuration of an information processing apparatus 30.

FIG. 2 illustrates the functional configurations of the display apparatus 20 and power feeding apparatus 40. FIG. 3 illustrates an exemplary functional configuration of the information processing apparatus 30 relating to the present embodiment. The display apparatus 20 includes therein a display's display section 200, a display's display control section 210, a display's communicating section 220, a storing unit 230, and a power receiving section 240. The storing unit 230 includes therein a file identifier storing section 232 and an update storing section 234. The power feeding apparatus 40 includes therein a power feeding section 400 and a power feeding control section 410. The information processing apparatus 30 includes therein a processing's display section 300, a processing's display control section 310, a first processing's communicating section 320, a file data control unit 330, a file data obtaining section 340, an editing control section 350, an update judging section 360, an update notifying section 362, an editing instruction obtaining section 370, an information input section 374, and a file data storing section 390. The file data control unit 330 includes therein a file data opening control section 332 and a file data closing control section 334.

The functional configuration of the power feeding apparatus 40 is first described. The power feeding apparatus 40 generates a magnetic field within a predetermined range, so as to supply power to the display apparatus 20. Specifically speaking, the power feeding section 400 of the power feeding apparatus 40 generates the magnetic field within the predetermined range. The power feeding section 400 feeds power to the display apparatus 20 without a direct contact with the power receiving section 240 of the display apparatus 20. The power feeding control section 410 controls the power fed to the power receiving section 240 from the power feeding section 400. For example, the power feeding control section 410 controls the amount of power fed from the power feeding section 400 to the power receiving section 240, by varying the state of the magnetic field. The power feeding control section 410 may also monitor the state of the magnetic field generated by the power feeding section 400. When the power receiving section 240 is placed and present within a predetermined range from the position of the power feeding section 400, the state of the magnetic field generated by the power feeding section 400 accordingly varies. Therefore, the power feeding control section 410 can know that the power receiving section 240 is placed and present within the predetermined range from the power feeding section 400, when detecting the variation in the state of the magnetic field generated by the power feeding section 400.

The functional configuration of the display apparatus 20 is next described. The display apparatus 20 displays thereon file data such as a document file and an image file. The file data displayed on the display apparatus 20 may be file data which may be edited by the information processing apparatus 30 external to the display apparatus 20. Here, the file data may be file data indicating an electronic medical record of a patient. The display apparatus 20 may be any one of electronic paper, a flexible display, rewritable paper, a paper-like display, digital paper, electronic paper, an electronic sheet, and an electronic display sheet which visibly display thereon the file data without power supply. To start with, the power receiving section 240 receives power from the magnetic field generated by the power feeding section 400 of the power feeding apparatus 40. The power receiving section 240 supplies the received power to the display's display control section 210 and display's communicating section 220. The power receiving section 240 may include therein an antenna coil. When configured by including therein such an antenna coil, the power receiving section 240 can realize noncontact power reception.

The storing unit 230 stores thereon a file identifier identifying file data displayed on the display apparatus 20 and the date and time on which the file data identified by the file identifier is updated. Specifically speaking, the file identifier storing section 232 stores thereon the file identifier identifying the file data. The file identifier may be a file name, for example. The file identifier may include therein information such as an URL indicating the location of the file data. The file identifier storing section 232 may store thereon the file identifier which identifies file data indicating an electronic medical record of each patient. The update storing section 234 stores thereon the date and time on which the file data displayed on the display apparatus 20 is updated. In other words, the update storing section 234 stores thereon the date and time on which the file data identified by the file identifier stored on the file identifier storing section 232 is updated. The update date and time stored may include the date (the year, month and day) and time (the hour, minute and second) on which the file data is updated. The storing unit 230 supplies the file identifier and update date and time to the display's communicating section 220 under the control of the display's communicating section 220.

The display's communicating section 220 makes a request to the storing unit 230 in order to extract the file identifier stored on the file identifier storing section 232 and the update date and time stored on the update storing section 234. The display's communicating section 220 transmits the extracted file identifier and update date and time to the information processing apparatus 30. Also, the display's communicating section 220 receives, from the information processing apparatus 30, the file data identified by the file identifier stored on the file identifier storing section 232. Here, when the display apparatus 20 is positioned within the predetermined range covered by the magnetic field generated by the power feeding apparatus 40 and the power receiving section 240 receives power, the display's communicating section 220 may use the power received by the power receiving section 240 to transmit the file identifier and update date and time to the information processing apparatus 30 and receive the file data identified by the file identifier.

The display's communicating section 220 may receive the file data indicating an electronic medical record which is identified by the file identifier. Here, the display's communicating section 220 transmits the file identifier stored on the file identifier storing section 232 to the information processing apparatus 30 at intervals of a predetermined transmission time period. Here, the transmission time period is shown as an example of a third time period relating to the claims. The display's communicating section 220 supplies, to the display's display control section 210, the file data which is identified by the file identifier stored on the file identifier storing section 232 and obtained from the information processing apparatus 30. When receiving data other than the file data, for example, character information from the information processing apparatus 30, the display's communicating section 220 may similarly supply the received character information or the like to the display's display control section 210.

The display's display control section 210 causes the display's display section 200 to display the file data received from the display's communicating section 220. When the display's display section 200 displays thereon predetermined file data, the display's display control section 210 may update the predetermined file data displayed on the display's display section 200 with the file data received from the display's communicating section 220. The display's display control section 210 may cause the display's display section 200 to display thereon the character information or the like received from the display's communicating section 220. The display's display section 200 displays thereon the file data which is identified by the file identifier stored on the file identifier storing section 232. Specifically speaking, the display's display section 200 displays thereon the file data which the display's communicating section 220 receives from the information processing apparatus 30, under the control of the display's display control section 210. The display's display section 200 may display thereon the file data indicating an electronic medical record. Here, the display's display section 200 is shown as an example of a display section included in a display apparatus relating to the claims.

The functional configuration of the information processing apparatus 30 shown in FIG. 3 is next described in the following. The information processing apparatus 30 manages the editing or viewing of the file data which is performed by the user. The first processing's communicating section 320 receives the file identifier stored on the file identifier storing section 232 and the update date and time stored on the update storing section 234, from the display apparatus 20. The first processing's communicating section 320 may be configured by including the antenna 322. The first processing's communicating section 320 receives the file identifier from the display's communicating section 220 at intervals of the predetermined transmission time period. The first processing's communicating section 320 supplies the received file identifier to the file data obtaining section 340. Also, the first processing's communicating section 320 supplies the received update date and time to the update judging section 360.

The file data storing section 390 stores thereon file data in association with a file identifier. Here, the file data may include one of document data and image data. The file data storing section 390 may store thereon file data indicating an electronic medical record of each patient, in association with a file identifier. The file data storing section 390 also stores thereon the update date and time of the file data in association with the file identifier. Under the control of the file data obtaining section 340, the file data storing section 390 supplies the file data and the update date and time of the file data to the file data obtaining section 340.

The file data obtaining section 340 extracts the file data which is identified by the file identifier received from the first processing's communicating section 320, from the file data storing section 390. The file data obtaining section 340 transmits the obtained file data to the display's communicating section 220 of the display apparatus 20, via the first processing's communicating section 320. The file data obtaining section 340 also supplies the obtained file data to the editing control section 350. Also, the file data obtaining section 340 supplies the obtained update date and time of the file data to the update judging section 360. When receiving the file identifier from the first processing's communicating section 320 at intervals of the predetermined transmission time period, the file data obtaining section 340 supplies information to the editing control section 350 which indicates the reception of the file identifier.

The information input section 374 receives an input of information by the user. The user may input information instructing the change of the contents of the file data. Here, the keyboard 376 and mouse 378 are shown as an example of the information input section 374. The information input section 374 supplies an instruction to edit the contents of the file data which is issued by the user, to the editing instruction obtaining section 370. The editing instruction obtaining section 370 obtains the instruction to edit the file data which is issued by the user, from the information input section 374. The editing instruction obtaining section 370 supplies the editing instruction issued by the user to the editing control section 350. The editing instruction obtaining section 370 judges that there is an access made by the user, when obtaining the input of the editing instruction by the user via the information input section 374. In this case, the editing instruction obtaining section 370 supplies information indicating that there is an access made by the user, to the file data control unit 330.

The editing control section 350 opens the file data under the control of the file data control unit 330. The editing control section 350 edits the opened file data based on the editing instruction issued by the user which is received from the editing instruction obtaining section 370. The editing control section 350 sets the status of the file data to the read-only status under the control of the file data control unit 330. The editing control section 350 closes the file data under the control of the file data control unit 330. The editing control section 350 supplies the edited file data to the file data obtaining section 340 and processing's display control section 310. When not editing the file data, the editing control section 350 supplies the unchanged file data to the processing's display control section 310.

When receiving the file identifier from the file data obtaining section 340 at intervals of the predetermined transmission time period, the editing control section 350 supplies the information indicating the reception of the file identifier to the file data control unit 330. The processing's display control section 310 causes the processing's display section 300 to display thereon the file data received from the editing control section 350. The processing's display section 300 displays thereon the file data under the control of the processing's display control section 310. Here, the monitor 302 is shown as an example of the processing's display section 300.

The file data control unit 330 controls the editing or viewing of the file data which is obtained by the file data obtaining section 340. Specifically speaking, the file data opening control section 332 makes a request to the editing control section 350 to open the file data which the editing control section 350 receives from the file data obtaining section 340, to enable the user to edit or view the file data. For example, the file data opening control section 332 may make a request to the editing control section 350 to open the file data with the use of an application software which enables the contents of the file data to be changed (for example, a word processor software, a spreadsheet software, or an image editing software) or an application software which does not enable the contents of the file data to be changed (for example, a viewing software or an image viewer).

If no access is made by the user to the file data which has been opened by the file data opening control section 332 during a predetermined standby time period, the file data closing control section 334 makes a request to the editing control section 350 to close the file data which has been opened by the file data opening control section 332, to prohibit the user from editing or viewing the file data. Here, the standby time period is shown as an example of a first time period relating to the claims. To be specific, when not receiving the information indicating that there is an access made by the user from the editing instruction obtaining section 370 for the predetermined standby time period, the file data closing control section 334 makes a request to the editing control section 350 to close the file data which has been opened by the file data opening control section 332.

When no access is made by the user to the file data which is opened by the file data opening control section 332 for a predetermined transmit time period, which is shorter than the predetermined standby time period, the file data closing control section 334 makes a request to the editing control section 350 to set the status of the file data which has been opened by the file data opening control section 332 to the read-only status, to prohibit the user from editing the file data. Here, the transmit time period is shown as an example of a second time period relating to the claims. To be specific, when not receiving the information indicating that there is an access made by the user from the editing instruction obtaining section 370 for the predetermined transmit time period which is shorter than the predetermined standby time period, the file data closing control section 334 makes a request to the editing control section 350 to set the status of the file data which has been opened by the file data opening control section 332 to the read-only status.

For example, the file data closing control section 334 sets the status of the file data to the read-only status by disabling the editing function of the application software used by the file data opening control section 332 to open the file data. Alternatively, the file data closing control section 334 may set the status of the file data to the read-only status by making a request to the editing control section 350 to discard the user's editing instruction which is supplied from the editing instruction obtaining section 370 to the editing control section 350.

As another alternative example, the file data closing control section 334 may set the status of the file data to the read-only status by reopening the file data with the use of an application software which enables the user only to view the contents of the file data, instead of the application software which is used by the file data opening control section 332 to open the file data. The file data closing control section 334 receives the file identifier from the editing control section 350 at intervals of the predetermined transmission time period. When not receiving the file identifier for a predetermined closing time period, which is longer than the predetermined transmission time period, the file data closing control section 334 may close the file which has been opened by the file data opening control section 332. Here, the closing time period is shown as an example of a fourth time period relating to the claims.

The update judging section 360 compares the update date and time received from the first processing's communicating section 320 with the update date and time of the file data which is received from the file data obtaining section 340. In this way, the update judging section 360 judges whether the file data which is displayed on the display's display section 200 of the display apparatus 20 has been updated. Specifically speaking, when the update date and time received from the first processing's communicating section 320 is less recent than the update date and time received from the file data obtaining section 340, the update judging section 360 makes the judgment that the file data which is identified by the file identifier and stored on the file data storing section 390 has been updated. The update judging section 360 supplies information indicating that the file data has been updated or information indicating that the file data has not been updated, to the update notifying section 362.

The update notifying section 362 causes the first processing's communicating section 320 to transmit the information received from the update judging section 360 which indicates that the file data has been or has not been updated, to the display's communicating section 220. The display's communicating section 220 supplies the information received from the first processing's communicating section 320 which indicates that the file data has been or has not been updated, to the display's display control section 210. The display's display control section 210 causes the display's display section 200 to display thereon the information received from the display's communicating section 220 which indicates that the file data has been or has not been updated.

When causing the display's display section 200 to display thereon the information indicating that the file data has been updated, the display's display control section 210 may cause the display's display section 200 to display thereon a character string saying, for example, "The file data has been updated.". Alternatively, when causing the display's display section 200 to display thereon the information indicating that the file data has been updated, the display's display control section 210 may cause the display's display section 200 to display thereon a predetermined mark or icon. On the other hand, when causing the display's display section 200 to display thereon the information indicating that the file data has not been updated, the display's display control section 210 may cause the display's display section 200 to display thereon a character string saying, for example, "The file data has not been updated.".

It should be noted that the display apparatus 20 may further include therein an editing selecting section which selects whether the contents of the file data identified by the file identifier stored on the file identifier storing section 232 are permitted to be changed or prohibited from being changed. If this is the case, the display's communicating section 220 further transmits, to the first processing's communicating section 320, information indicating the selection made by the editing selecting section between the permission and prohibition of the change of the contents of the file data. To be specific, the editing selecting section may be a switch which can mechanically make the selection between the permission and prohibition of the change of the contents of the file data. When supplied with power from the power receiving section 240, the editing selecting section supplies the information indicating the selection made by the user between the permission and prohibition of the change of the contents of the file data, to the display's communicating section 220.

The first processing's communicating section 320 further receives the information indicating the selection made by the editing selecting section between the permission and prohibition of the change of the contents of the file data, from the display's communicating section 220. The first processing's communicating section 320 supplies the received information indicating the permission or prohibition of the change of the contents of the file data, to the file data control unit 330. When the first processing's communicating section 320 receives information indicating the permission of the change of the contents of the file data, the file data opening control section 332 makes a request to the editing control section 350 to open the file data obtained by the file data obtaining section 340 and permit the user to edit the file data. On the other hand, when the first processing's communicating section 320 receives information indicating the prohibition of the change of the contents of the file data, the file data closing control section 334 prohibits the user from editing the file data obtained by the file data obtaining section 340.

After the information processing apparatus 30 opens the file data identified by the file identifier received from the display apparatus 20, the display system 10 relating to the present embodiment can automatically close the opened file data under the condition that no access is made by the user to the information processing apparatus 30 for a predetermined time period. With this configuration, the information processing apparatus 30 can automatically close the file data even when the user edits the file data opened by the information processing apparatus 30 and then forgets to close the edited file data. As a result, the present embodiment can prevent a person other than the user from viewing the contents of the file data.

After the information processing apparatus 30 opens the file data identified by the file identifier received from the display apparatus 20, the display system 10 relating to the present embodiment sets the status of the file data to the read-only status under the condition that no access is made by the user to the information processing apparatus 30 for a predetermined period of time. If no access is made by the user for another predetermined period of time, the information processing apparatus 30 can close the file data the status of which has been set to the read-only status. With the above-described configuration, the information processing apparatus 30 can automatically set the status of the file data to the read-only status, even when the user leaves the file data opened on the information processing apparatus 30 and forgets to close the file data. As a result, the present embodiment can prevent a person other than the user from editing the contents of the file data.

While the information processing apparatus 30 receives the file identifier from the display apparatus 20 at intervals of the predetermined time period, the display system 10 relating to the present embodiment can keep the file data opened. However, when the information processing apparatus 30 does not receive the file identifier from the display apparatus 20 at intervals of the predetermined time period, the display system 10 can close the opened file data. With this configuration, when the user moves the display apparatus 20 to a location where the display apparatus 20 can not have communication with the information processing apparatus 30, for example, the display system 10 relating to the present embodiment can automatically close the file data even when the user leaves the file data opened on the information processing apparatus 30 and forgets to close the file data. As a result, the present embodiment can improve the security of the file data.

In other embodiments, the display system 10 may manage electronic medical records. In this case, the display system 10 includes a reception machine that receives an input of a patient identifier identifying each patient, the display apparatus 20 that displays thereon the file data indicating the electronic medical record for each patient, and the information processing apparatus 30 that manages the editing or viewing, by a doctor, of the file data indicating the electronic medical record. Specifically speaking, the reception machine receives an input of a patient identifier by a patient. Here, the patient identifier may include characters and numbers, and uniquely identify the patient. The reception machine transmits the received patient identifier to the first processing's communicating section 320 included in the information processing apparatus 30.

Here, the file data storing section 390 included in the information processing apparatus 30 may store thereon a plurality of pieces of file data indicating electronic medical records of patients, in association with patient identifiers. The file data obtaining section 340 obtains the file data indicating the electronic medical record, which is stored on the file data storing section 390 in association with the patient identifier received by the first processing's communicating section 320. Subsequently, the file data obtaining section 340 causes the first processing's communicating section 320 to transmit the obtained file data indicating the electronic medical record to the display's communicating section 220 included in the display apparatus 20. The display's communicating section 220 supplies the file data indicating the electronic medical record which is received from the first processing's communicating section 320, to the display's display control section 210. The display's display control section 210 causes the display's display section 200 to display thereon the file data indicating the electronic medical record.

The file data obtaining section 340 also supplies the obtained file data indicating the electronic medical record to the editing control section 350. The editing control section 350 supplies the file data indicating the electronic medical record which is received from the file data obtaining section 340, to the processing's display control section 310. The processing's display control section 310 causes the processing's display section 300 to display thereon the file data indicating the electronic medical record which is received from the editing control section 350.

According to the display system 10 relating to the present embodiment, when the reception machine receives the patient identifier, the display apparatus 20 provided for the doctor displays thereon the electronic medical record of the patient identified by the received patient identifier. Also, the information processing apparatus 30 provided for the doctor displays thereon the electronic medical record of the patient identified by the received patient identifier. With this configuration, the present embodiment can significantly reduce the time period for searching for a desired medical record, when compared with a case where the doctor searches for a medical record of a particular patient from an enormous number of paper medical records, and a case where the doctor manually searches an enormous number of pieces of file data indicating electronic medical records stored on the information processing apparatus 30. As a result, the doctor can reduce the time period for searching for the paper or electronic medical record of the patient, and thus use a longer time for diagnosing the patient.

When managing electronic medical records, the display system 10 may include the reception machine, a combination of the display apparatus 20 and information processing apparatus 30 for a first doctor, and a combination of the display apparatus 20 and information processing apparatus 30 for a second doctor. To be specific, the reception machine receives an input of a patient identifier by a patient. The reception machine transmits the received patient identifier to the information processing apparatuses 30 for the first and second doctors. In this case, the reception machine further transmits information indicating which one of the first and second doctors diagnoses the patient earlier to the information processing apparatuses 30 for the first and second doctors.

For example, a case is assumed where the first doctor diagnoses the patient earlier. In this case, the reception machine transmits, to the information processing apparatuses 30 for the first and second doctors, the patient identifier and information indicating that the first doctor diagnoses the patient earlier than the second doctor. When receiving the patient identifier and information indicating that the first doctor diagnoses the patient earlier from the reception machine, the information processing apparatus 30 for the first doctor causes the display apparatus 20 for the first doctor to display thereon the file data indicating the electronic medical record of the patient. On the other hand, when receiving the patient identifier and information indicating that the first doctor diagnoses the patient earlier from the reception machine, the information processing apparatus 30 for the second doctor prohibits the second doctor from editing the contents of the file data indicating the electronic medical record of the patient. With this configuration, the present embodiment can prevent a case from occurring where the first and second doctors both change the contents of the file data indicating the electronic medical record of the same patient.

When the first doctor diagnoses the patient and resultantly updates the contents of the file data indicating the electronic medical record of the patient via the information processing apparatus 30, the information processing apparatus 30 for the first doctor transmits the file data indicating the updated electronic medical record to the information processing apparatus 30 for the second doctor. Following this, the information processing apparatus 30 for the second doctor updates the file data indicating the electronic medical record stored on the file data storing section 390 of the information processing apparatus 30 for the second doctor, with the file data indicating the updated electronic medical record which is received from the information processing apparatus 30 for the first doctor. The information processing apparatus 30 for the second doctor updates the contents displayed on the display apparatus 20 for the second doctor.

Here, the display system 10 managing the electronic medical records may further include therein another display apparatus 20 for the patient. The display apparatus 20 for the patient may display thereon information including the department which the patient should visit and the route to the department. Also, the display apparatus 20 for the patient may have a function as the patient's registration card. In other words, the display apparatus 20 for the patient may further include therein a storing section that stores thereon a patient identifier identifying the patient, the name, age, sex, address and previous diseases of the patient, the names of the hospitals or doctors which the patient has so far visited, the contact numbers of the previous doctors, and the like. The display apparatus 20 for the patient may display thereon, for example, the name of the patient.

The reception machine reads the patient identifier from the display apparatus 20 for the patient. The reception machine then transmits, to the display apparatus 20 for the patient, the information indicating a first department to which the first doctor from whom the patient should seek a diagnosis belongs and the route to the first department. The display apparatus 20 for the patient displays thereon the information received from the reception machine, which indicates the first department the patient should visit and the route to the first department. After the patient visits the first department, the information processing apparatus 30 for the first doctor transmits, to the display apparatus 20 for the patient, information indicating a second department the patient should next visit and the route to the second department. The display apparatus 20 for the patient displays thereon the information indicating the second department and the route to the second department.

Figure 4:
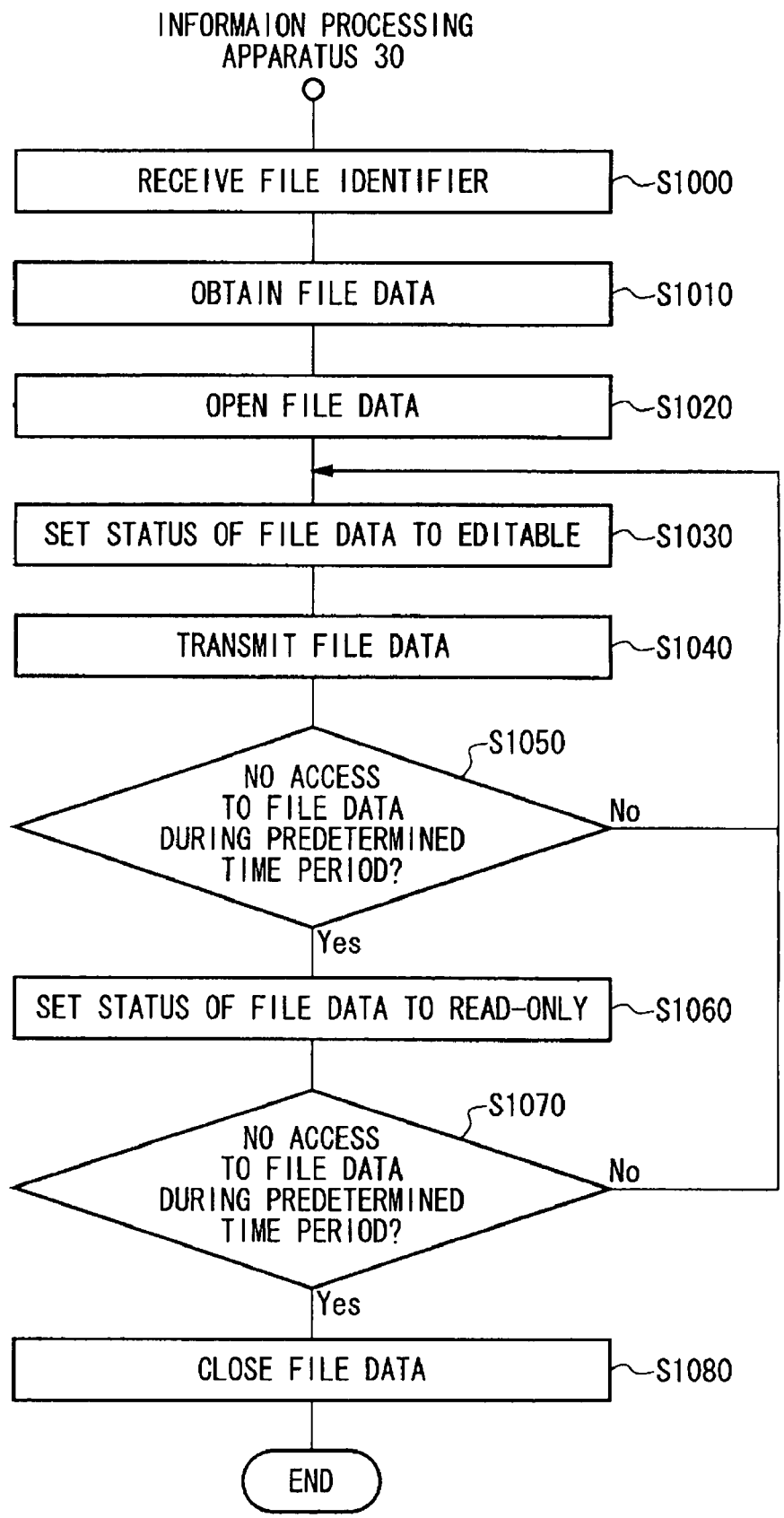
FIG. 4 is a flow chart illustrating the processes performed by the display system 10.

FIG. 4 is a flow chart illustrating, as an example, the processes performed by the display system 10 relating to the present embodiment. To start with, the display apparatus 20 keeps the standby status until the power receiving section 240 receives power from the power feeding apparatus 40. When the power receiving section 240 receives power, the display's communicating section 220 uses the power received by the power receiving section 240 to make a request to the file identifier storing section 232 to obtain the file identifier stored on the file identifier storing section 232. The display's communicating section 220 transmits the obtained file identifier to the information processing apparatus 30. The first processing's communicating section 320 of the information processing apparatus 30 receives the file identifier from the display's communicating section 220 (step S1000). The first processing's communicating section 320 supplies the received file identifier to the file data obtaining section 340.

The file data obtaining section 340 obtains file data identified by the file identifier received from the first processing's communicating section 320, from the file data storing section 390 (step S1010). The file data obtaining section 340 then supplies the obtained file data to the editing control section 350. The editing control section 350 opens the file data received from the file data obtaining section 340, under the control of the file data opening control section 332 (step S1020). The file data opening control section 332 sets the status of the file data to the editable status (step S1030). In other words, the file data opening control section 332 sets the status of the file data to the editable status, to process the file data based on the user's editing instruction which is obtained by the editing instruction obtaining section 370.

Subsequently, the file data obtaining section 340 causes the first processing's communicating section 320 to transmit the file data the contents of which have been edited by the user to the display's communicating section 220 (step S1040). The display's communicating section 220 supplies the file data received from the first processing's communicating section 320 to the display's display control section 210. The display's display control section 210 causes the display's display section 200 to display thereon the file data received from the display's communicating section 220.

Here, when no access is made by the user to the file data for a predetermined period of time (step S1050:YES), the file data closing control section 334 makes a request to the editing control section 350 to set the status of the file data which has been opened by the file data opening control section 332 to the read-only status (step S1060). When an access is made by the user to the file data within the predetermined period of time (step S1050:NO), the file data closing control section 334 does not set the status of the file data opened by the file data opening control section 332 to the read-only status.

When no access is made by the user to the file data for another predetermined period of time (step S1070:YES), the file data closing control section 334 makes a request to the editing control section 350 to close the file data which has been opened by the file data opening control section 332 (step S1080). When an access is made by the user to the file data for this predetermined period of time (step S1070:NO), the file data closing control section 334 does not close the file data which has been opened by the file data opening control section 332. In this case, the file data opening control section 332 may set the status of the file data back to the editable status.

Figure 5:
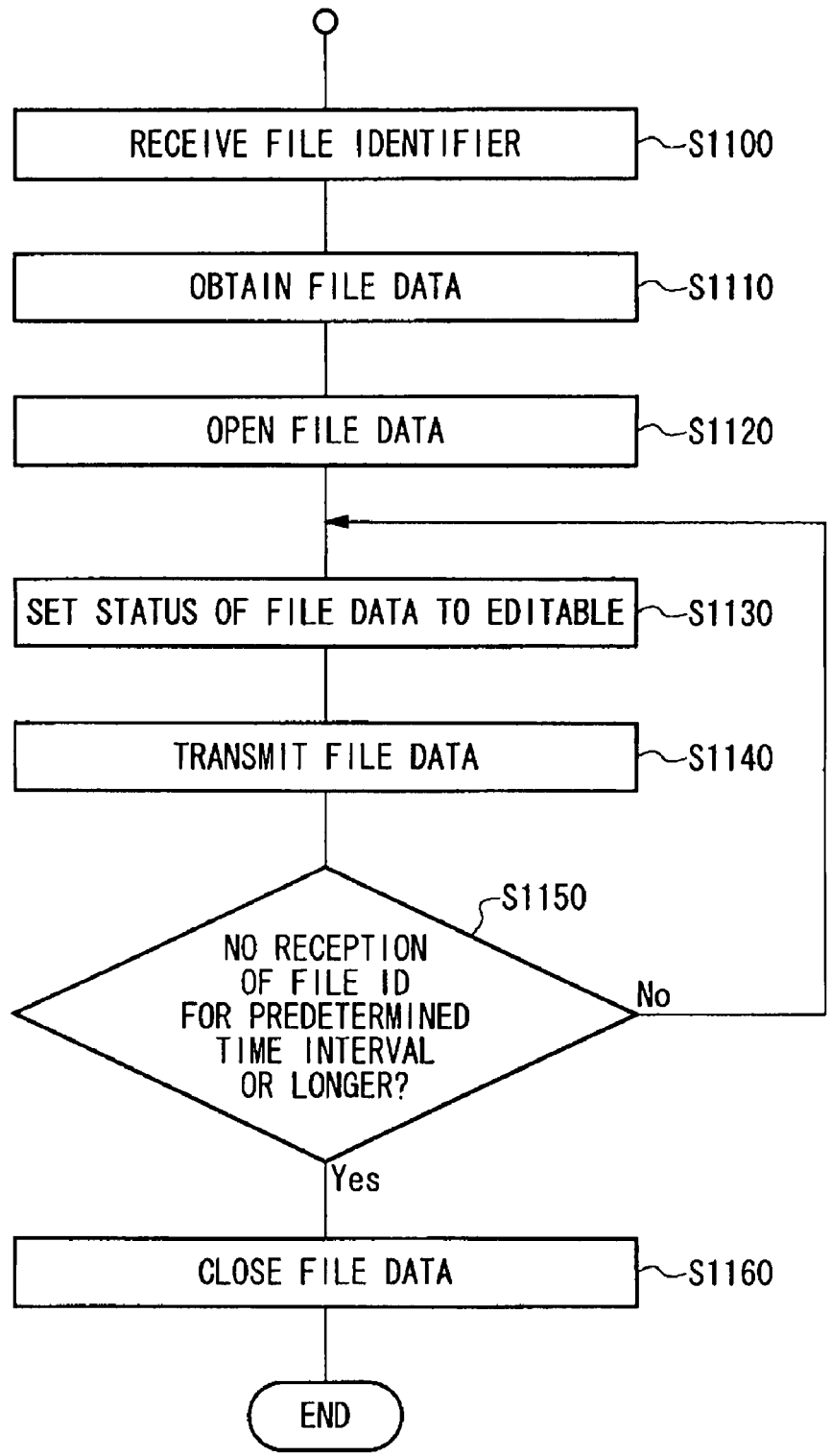
FIG. 5 is a flow chart illustrating the processes performed by the display system 10.

FIG. 5 is a flow chart illustrating, as an example, the processes performed by the display system 10 relating to the present embodiment. To start with the display apparatus 20 keeps the standby status until the power receiving section 240 receives power from the power feeding apparatus 40. When the power receiving section 240 receives power, the display's communicating section 220 uses the power received by the power receiving section 240 to make a request to the file identifier storing section 232 to obtain the file identifier stored on the file identifier storing section 232. The display's communicating section 220 transmits the obtained file identifier to the information processing apparatus 30. Here, the display's communicating section 220 transmits the file identifier to the information processing apparatus 30 at intervals of the predetermined transmission time period.

The first processing's communicating section 320 of the information processing apparatus 30 receives the file identifier from the display's communicating section 220 (step S1100). Here, the first processing's communicating section 320 receives the file identifier transmitted from the display's communicating section 220 at intervals of the predetermined transmission time period. The first processing's communicating section 320 supplies the received file identifier to the file data obtaining section 340. The file data obtaining section 340 obtains the file data identified by the file identifier received from the first processing's communicating section 320, from the file data storing section 390 (step S1110). The file data obtaining section 340 then supplies the obtained file data to the editing control section 350.

Once the file data obtaining section 340 obtains the file data identified by the file identifier from the file data storing section 390, the file data obtaining section 340 does not need to obtain the same file data from the file data storing section 390 even when receiving the same file identifier again from the first processing's communicating section 320. The editing control section 350 opens the file data received from the file data obtaining section 340, under the control of the file data opening control section 332 (step S1120).

The file data opening control section 332 sets the status of the file data to the editable status (step S1130). In other words, the file data opening control section 332 sets the status of the file data to the editable status, to process the file data based on the user's editing instruction which is obtained by the editing instruction obtaining section 370. Subsequently, the file data obtaining section 340 causes the first processing's communicating section 320 to transmit the file data the contents of which have been edited by the user to the display's communicating section 220 (step S1140). The display's communicating section 220 supplies the file data received from the first processing's communicating section 320 to the display's display control section 210. The display's display control section 210 causes the display's display section 200 to display thereon the file data received from the display's communicating section 220.

When the first processing's communicating section 320 does not receive, from the display's communicating section 220, the file identifier which the display's communicating section 220 transmits at intervals of the predetermined transmission time period, for a longer time period than the predetermined transmission time period (step S1150:YES), the file data closing control section 334 makes a request to the editing control section 350 to close the file data (step S1160). When the first processing's communicating section 320 keeps receiving, from the display's communicating section 220, the file identifier which the display's communicating section 220 transmits at intervals of the predetermined transmission time period (step S1150:NO), the file data closing control section 334 does not close the file data.

Figure 6:
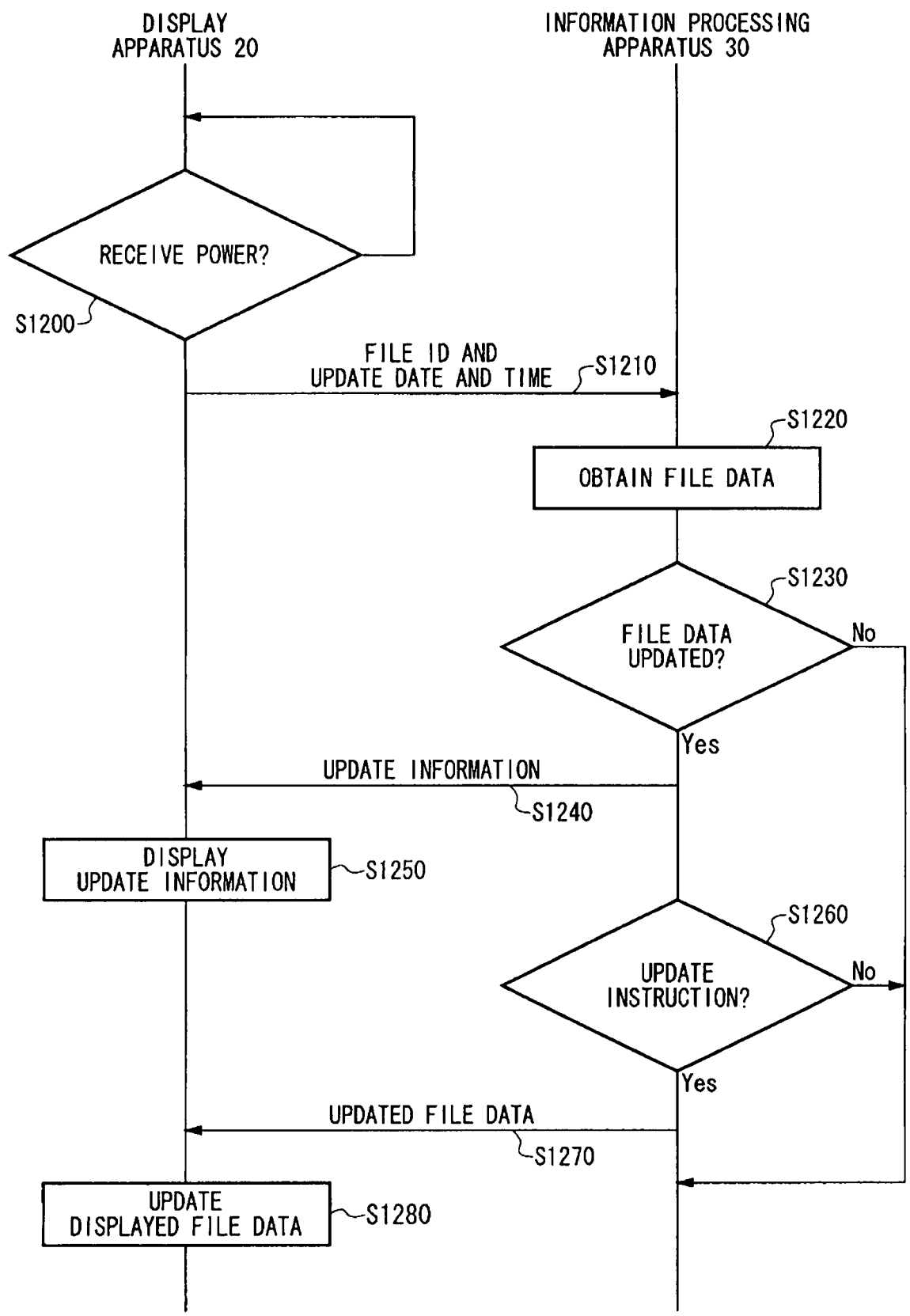
FIG. 6 is a flow chart illustrating the processes performed by the display system 10.

FIG. 6 is a flow chart illustrating, as an example, the processes performed by the display system 10 relating to the present embodiment. To start with, the display apparatus 20 keeps the standby status until the power receiving section 240 receives power from the power feeding apparatus 40 (step S1200). When the power receiving section 240 receives power, the display's communicating section 220 uses the power received by the power receiving section 240 to make a request to the file identifier storing section 232 and update storing section 234 to obtain the file identifier stored on the file identifier storing section 232 and the update date and time stored on the update storing section 234. The display's communicating section 220 transmits the obtained file identifier and update date and time to the information processing apparatus 30 (step S1210).

The first processing's communicating section 320 of the information processing apparatus 30 receives the file identifier from the display's communicating section 220. The first processing's communicating section 320 supplies the received file identifier to the file data obtaining section 340. Also, the first processing's communicating section 320 supplies the received update date and time to the update judging section 360. The file data obtaining section 340 obtains the file data identified by the file identifier received from the first processing's communicating section 320, from the file data storing section 390 (step S1220). The file data obtaining section 340 also obtains the update date and time of the file data identified by the file identifier. The file data obtaining section 340 then supplies the obtained file data to the editing control section 350. The file data obtaining section 340 also supplies the obtained update date and time to the update judging section 360.

The update judging section 360 compares the update date and time received from the first processing's communicating section 320 and the update date and time received from the file data obtaining section 340 to each other, to judge whether the file data stored on the file data storing section 390 has been updated (step S1230). When judging that the file data has been updated (step S1230:YES), the update judging section 360 supplies update information indicating that the file data has been updated to the update notifying section 362. The update notifying section 362 causes the first processing's communicating section 320 to transmit the update information to the display's communicating section 220 (step S1240). The display's communicating section 220 supplies the update information received from the first processing's communicating section 320 to the display's display control section 210. The display's display control section 210 causes the display's display section 200 to display thereon the update information (step S1250).

Here, the information input section 374 of the information processing apparatus 30 receives an instruction to update the file data which is issued by the user (step S1260). When receiving the user's update instruction for the file data, the information input section 374 supplies the update instruction to the editing instruction obtaining section 370. The editing instruction obtaining section 370 supplies the received update instruction to the file data obtaining section 340. When receiving the update instruction (step S1260:YES), the file data obtaining section 340 obtains the updated file data from the file data storing section 390, and supplies the updated file data to the first processing's communicating section 320. The first processing's communicating section 320 transmits the updated file data received from the file data obtaining section 340 to the display's communicating section 220 (step S1270). The display's communicating section 220 supplies the updated file data received from the first processing's communicating section 320 to the display's display control section 210. The display's display control section 210 updates the file data displayed on the display's display section 200 with the updated file data (step S1280).

According to the display system 10 relating to the present embodiment, the display apparatus 20 can display thereon notification saying that the file data has been updated when the file data displayed on the display apparatus 20 has been updated through the information processing apparatus 30. With this configuration, the user can be notified that the file data displayed on the display apparatus 20 has been updated through the information processing apparatus 30, without actual update of the file data. As a result, if the user has not read through the file data displayed on the display apparatus 20, for example, the user can permit the update of the file data after reading through the file data.

Figure 7:
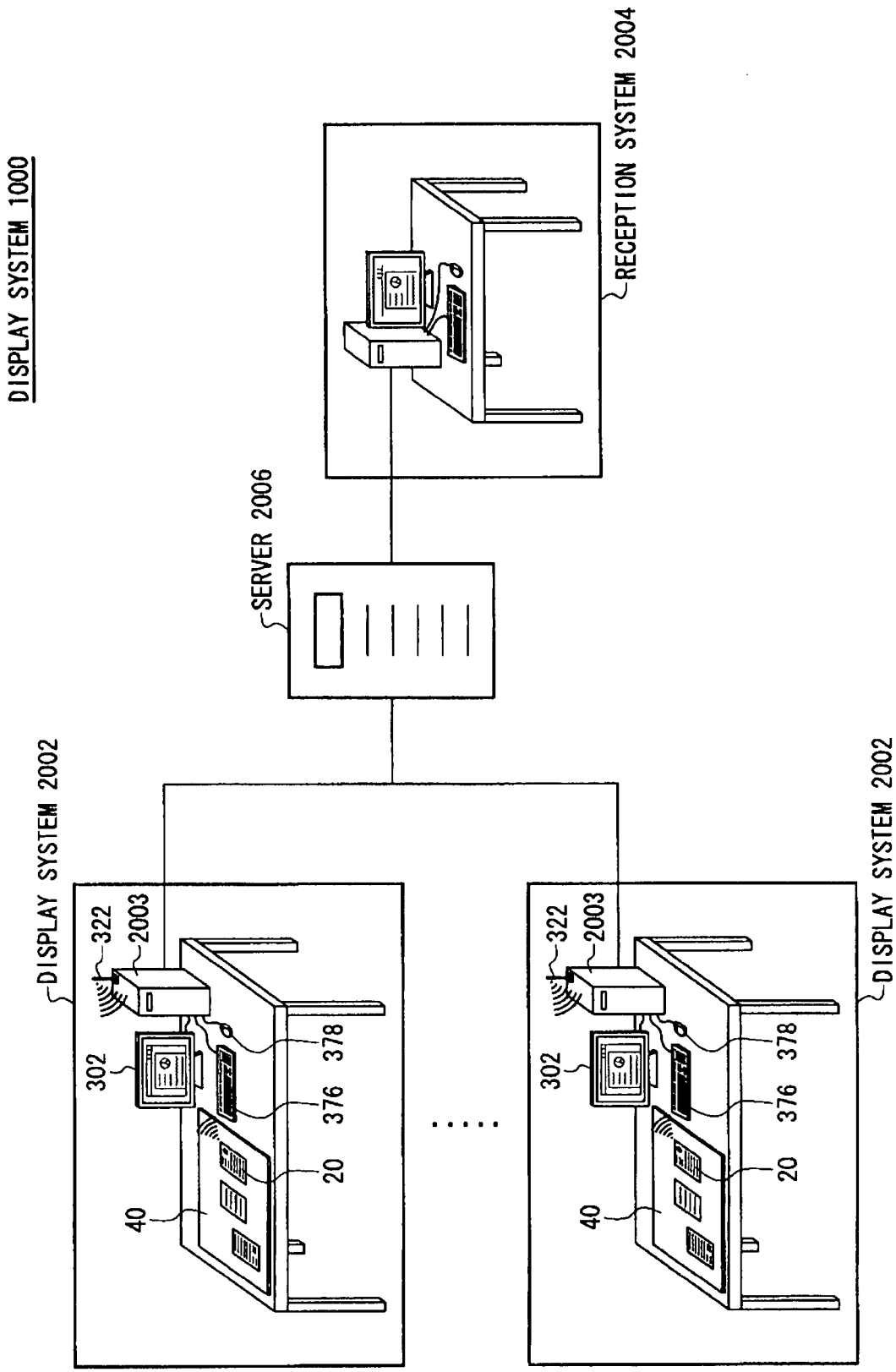
FIG. 7 is a schematic view illustrating a display system 1000.

FIG. 7 is a schematic view illustrating a display system 100 relating to a second embodiment. The display system 1000 includes therein a plurality of display systems 2002, a server 2006, and a reception system 2004. The server 2006 is connected to each of the plurality of display systems 2002 and reception system 2004 via an electronic communication line such as the LAN. Note that the following description is made with a main focus on the differences between the functions of the display systems 2002 and the functions of the display system 10. Except for the functions described in the following, the display systems 2002 may have the same functions as the display system 10 described with reference to FIGS. 1 to 6.

When the display apparatus 20 is placed on the power feeding apparatus 40, an information processing apparatus 2003 receives a file identifier identifying a patient via an antenna 322 from the display apparatus 20. Based on the received file identifier, the information processing apparatus 2003 requests the server 2006 to read file data. Furthermore, the information processing apparatus 2003 requests the server 2006 to read file data based on a file identifier input through the keyboard 376.

The server 2006 stores thereon a plurality of pieces of file data in association with a plurality of file identifiers, in a one-to-one correspondence. Also, the server 2006 stores thereon a viewing right which determines whether viewing of the file data is permitted in response to the read request of the file data which is issued by the information processing apparatus 2003, and an editing right which determines editing of the file data is permitted in response to the read request of the file data which is issued by the information processing apparatus 2003. The server 2006 further stores thereon an apparatus identifier which indicates whether the information processing apparatus 2003 is permitted to view the requested file data. The server 2006 also stores thereon using apparatus identifying information which identifies the information processing apparatus 2003 which keeps the requested file data opened. Based on the pieces of information stored thereon, the server 2006 controls the viewing or editing of the plurality of pieces of file data.

The reception system 2004 includes therein a reception machine which obtains a file identifier of an electronic medical record of a patient from the patient's registration card or the like. Furthermore, the reception machine receives an input of a department the patient is going to visit and identifies one of the information processing apparatuses 2003 which belongs to a doctor corresponding to the department the patient is going to visit. The reception machine determines the identified information processing apparatus 2003 to be a permitted apparatus which is permitted to use the file data of the patient. The reception machine adds an apparatus identifier identifying the permitted apparatus to the file identifier, and transmits the file identifier and apparatus identifier to the server 2006.

With the above-described configuration, the second embodiment of the present invention can use as a key the display apparatus 20 such as electronic paper which displays thereon the electronic medical record, and put a limitation on the display or edition of the electronic medical record through the information processing apparatuses 2003 in accordance with a predetermined condition. As a consequence, the second embodiment can prevent a third person who has no right to view or edit the electronic medical record from viewing and editing the electronic medical record. For example, a case is assumed where one or more predetermined information processing apparatuses 2003 are permitted to display thereon an electronic medical record of a particular patient and registered in the internal hospital computer system. In this way, even when the patient mistakenly enters into a wrong doctor's office, the electronic medical record of the patient can not be viewed via the information processing apparatus 2003 provided in the wrong doctor's office. Consequently, the present embodiment can prevent a doctor from making a diagnosis for a patient with reference to a wrong medical record, thereby preventing possible medical malpractice.

Figure 8:
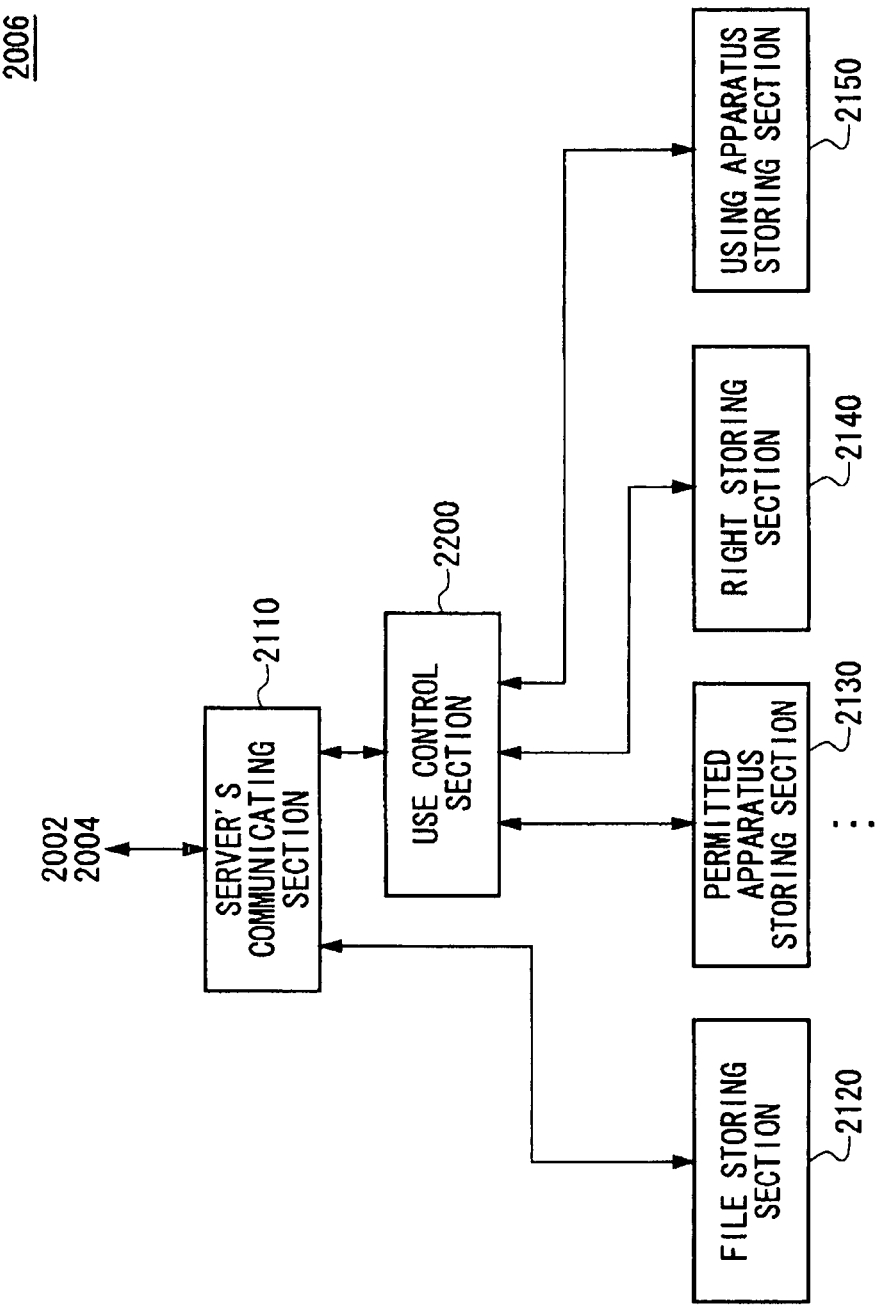
FIG. 8 illustrates the functional configuration of a server 2006.

FIG. 8 illustrates an exemplary functional configuration of the server 2006. The server 2006 includes therein a server's communicating section 2110, a file storing section 2120, a permitted apparatus storing section 2130, a right storing section 2140, a using apparatus storing section 2150, and a use control section 2200.

The file storing section 2120 stores thereon a plurality of pieces of file data in association with a plurality of file identifiers in a one-to-one correspondence. The permitted apparatus storing section 2130 stores thereon, in association with each of the plurality of file identifiers, an apparatus identifier identifying an information processing apparatus which is permitted to edit or view the file data identified by the file identifier.

The right storing section 2140 stores thereon, in association with each of the plurality of file identifiers, an editing or viewing right for the corresponding file data, in relation to information indicating whether the display's communicating section 220 transmits the same file identifier to the information processing apparatus 2003. The using apparatus storing section 2150 stores thereon using apparatus information identifying the information processing apparatus 2003 which keeps the file data opened.

When the information processing apparatus 2003 requests the server 2006 to read file data, the use control section 2200 judges whether the information processing apparatus 2003 is permitted to obtain the file data. When permitting the information processing apparatus 2003 to obtain the file data, the use control section 2200 controls the use of the file data by the information processing apparatus 2003, based on at least one of the associated apparatus identifier, viewing right, editing right, and using apparatus information.

For example, when the information processing apparatus 2003 transmits a file identifier to request the server 2006 to read file data corresponding to the file identifier, the use control section 2200 judges that the information processing apparatus 2003 is not permitted to obtain the corresponding file data, based on the judgment that the apparatus identifier of the information processing apparatus 2003 which has issued the read request is not included in the permitted apparatus storing section 2130. Alternatively, the use control section 2200 only permits the information processing apparatus 2003 to open the file data with the status thereof being set to the read-only status, based on the judgment that the associated editing right does not authorize editing. Here, when not permitting the information processing apparatus 2003 to obtain the file data, the use control section 2200 may notify the information processing apparatus 2003 of the reason why the information processing apparatus 2003 is not permitted to obtain the file data.

The server's communicating section 2110 transmits the file identifier, file data, apparatus identifier, viewing right, or editing right, to the information processing apparatus 2003. Also, the server's communicating section 2110 receives the file data which is edited or created by the display system 2002, and the apparatus identifying information from the reception system 2004.

FIG. 9 illustrates an example of a data table stored on the right storing section 2140. According to the example shown in FIG. 9, the viewing and editing rights are collectively shown as an editing/viewing right in one table. However, the right storing section 2140 may store thereon two tables respectively for viewing and editing rights.

The right storing section 2140 stores thereon the viewing and editing rights in association with each file identifier. The right storing section 2140 stores thereon the viewing and editing rights also in association with information indicating whether the display apparatus 20 is present or absent. For example, when the information processing apparatus 2003 receives a file identifier from the display apparatus 20, a file identifier 3001 is associated with the viewing, saving, printing and rewriting rights. When the information processing apparatus 2003 is not receiving a file identifier from the display apparatus 20, the file identifier 3001 is associated with the viewing right only.

The viewing or editing right may be varied by other conditions than the file identifier and information indicating whether a display apparatus is present or absent. For example, the viewing or editing right may be varied depending on the apparatus identifiers identifying the information processing apparatuses 2003.

According to the present embodiment, the viewing or editing right is determined in association with each file identifier and information indicating whether a display apparatus is present or absent. Therefore, the permissive levels of viewing or editing can be varied in accordance with the importance of each piece of file data. As a result, the present embodiment can appropriately control viewing of file data or prevent falsification of file data, depending on importance of the file data.

FIG. 10 illustrates one example of a data table stored on the permitted apparatus storing section 2130. The permitted apparatus storing section 2130 stores thereon, in association with each file identifier, an apparatus identifier identifying an apparatus which is permitted to view the corresponding file data. For example, the permitted apparatus storing section 2130 stores thereon, in association with the identifier of the file data indicating the electronic medical record of the patient who is checked in at the reception system 2004, the apparatus identifier identifying the information processing apparatus 2003 belonging to the doctor who diagnoses the patient. The apparatus identifier of the permitted apparatus is, for example, an IP address, an MAC address or the like.

According to the present embodiment, each file identifier is associated with one or more permitted apparatuses. Therefore, the present embodiment can limit the use of file data to one or more particular information processing apparatuses 2003. In other words, when the display apparatus 20 is placed on the power feeding apparatus 40, the display system 1000 relating to the present embodiment can select one or more information processing apparatuses 2003 irrespective of the viewing or editing right. As a consequence, the present embodiment can flexibly vary the viewing or editing right in accordance with the level of confidentiality of each piece of file data.

When file data identified by a file identifier stored on the permitted apparatus storing section 2130 is read by one of the permitted apparatuses associated with the file identifier, the permitted apparatus storing section 2130 may delete, from the data table, the apparatus identifier of the apparatus which has read the file data. With such a configuration, the present embodiment can permit the permitted apparatuses associated with each file identifier to use the corresponding file data only at the predetermined number of times.

Figure 11:
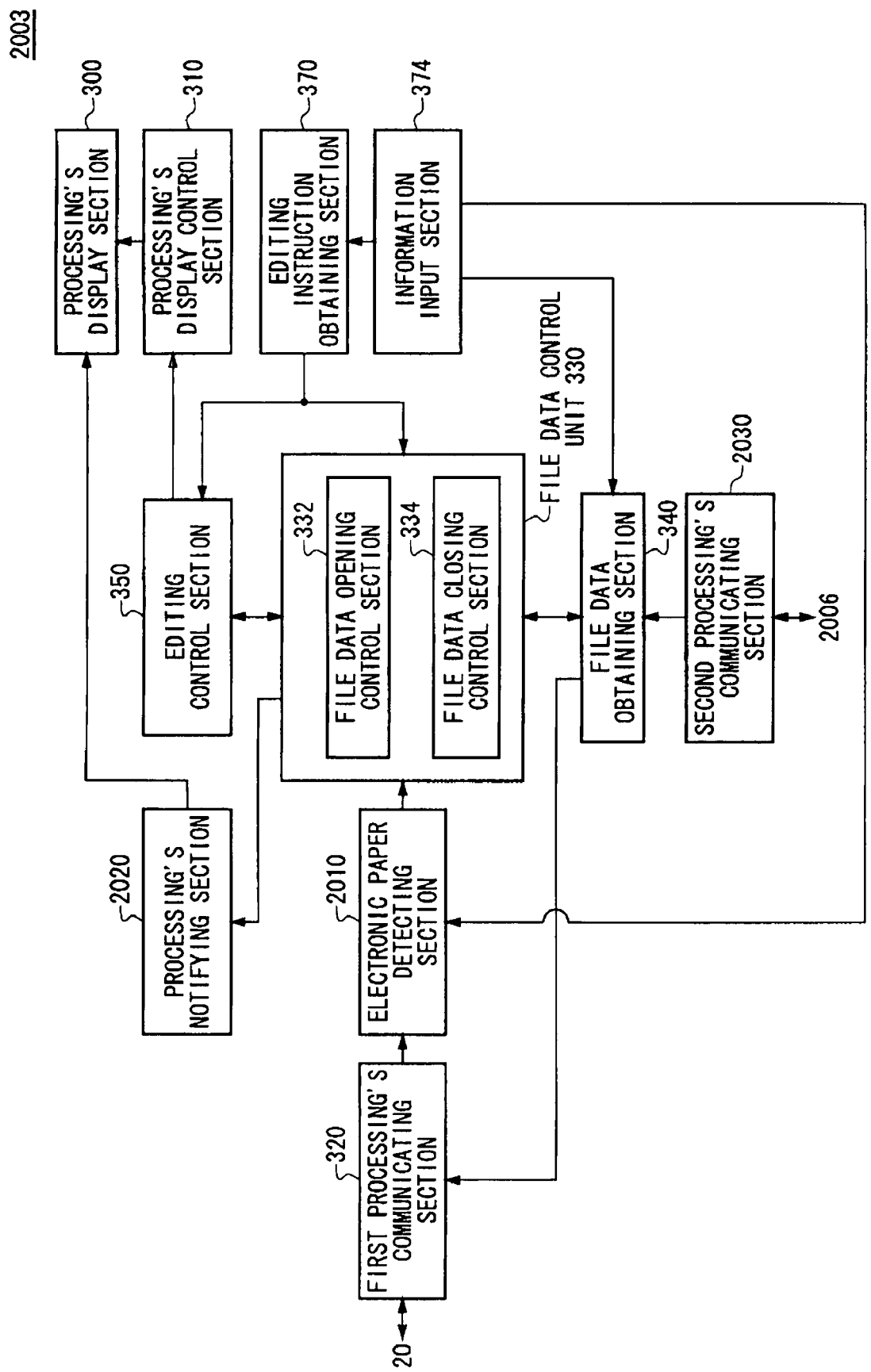
FIG. 11 illustrates the functional configuration of an information processing apparatus 2003.

FIG. 11 illustrates an exemplary functional configuration of the information processing apparatus 2003. The information processing apparatus 2003 may have the same functions as the information processing apparatus 30 described with reference to FIGS. 1 to 6. In the following description, the functions common to the information processing apparatuses 2003 and 30 are not described in detail.

The information processing apparatus 2003 includes therein the processing's display section 300, the processing's display control section 310, the first processing's communicating section 320, the file data control unit 330, the file data obtaining section 340, the editing control section 350, the editing instruction obtaining section 370, the information input section 374, an electronic paper detecting section 2010, a processing's notifying section 2020, and a second processing's communicating section 2030. The file data control unit 330 includes therein the file data opening control section 332 and file data closing control section 334.

The information input section 374 receives a file identifier identifying file data, which is designated by the user. The information input section 374 supplies the received file identifier to the file data obtaining section 340 and electronic paper detecting section 2010.

The display's communicating section 220 transmits the file identifier stored on the file identifier storing section 232 to the information processing apparatus 2003 at intervals of a predetermined time period. The electronic paper detecting section 2010 detects whether the file identifier is transmitted from the display's communicating section 220 of the display apparatus 20 to the first processing's communicating section 320. When detecting that the file identifier is transmitted, the electronic paper detecting section 2010 supplies, to the file data control unit 330, identifier detection information indicating that the file identifier is transmitted and the file identifier.

The electronic paper detecting section 2010 also detects whether the file identifier transmitted from the display's communicating section 220 is the same as the file identifier received by the information input section 374. When detecting that the file identifiers are the same, the electronic paper detecting section 2010 supplies identifier match information indicating that the file identifiers are the same, to the file data control unit 330. Furthermore, the electronic paper detecting section 2010 detects whether the display's communicating section 220 transmits the same file identifier to the information processing apparatus 2003 at intervals of a predetermined time period after the file data opening control section 332 opens the file data.

When the electronic paper detecting section 2010 detects that the display's communicating section 220 transmits the same file identifier, the file data opening control section 332 opens the file data obtained by the file data obtaining section 340 to enable the user to edit or view the file data. When the electronic paper detecting section 2010 detects that the display's communicating section 220 does not transmit the same file identifier, the file data closing control section 334 closes the file data which has been opened by the file data opening control section 332 to prohibit the user from editing or viewing the file data. In addition, the file data opening control section 332 and file data closing control section 334 respectively open and close the file data, in compliance with the editing or viewing right stored on the right storing section 2140.

The file data opening control section 332 opens the file data to enable the user to edit or view the file data, under the condition that the apparatus identifier identifying the information processing apparatus 2003 is stored on the permitted apparatus storing section 2130 in association with the file identifier transmitted from the display's communicating section 220. Specifically speaking, the file data opening control section 332 gives permission to set the status of the file data to the editable or viewable status, under the condition that the apparatus identifier stored on the permitted apparatus storing section 2130, which is transmitted from the use control section 2200, matches the apparatus identifier identifying the information processing apparatus 2003. When the permission is given based on the information stored on the use control section 2200, the file data opening control section 332 obtains the file data identified by the file identifier received from the display's communicating section 220, from the file storing section 2120, and opens the obtained file data with its status being set to the editable or viewable status.

When the apparatus identifier identifying the information processing apparatus 2003 is not stored on the permitted apparatus storing section 2130 in association with the file identifier transmitted from the display's communicating section 220, the processing's notifying section 2020 notifies the user of the result. Specifically speaking, when the file data opening control section 332 is not permitted to open the file data because the apparatus identifier is not stored on the permitted apparatus storing section 2130, the file data opening control section 332 receives, from the use control section 2200, information indicating that the apparatus identifier is not stored on the permitted apparatus storing section 2130. The file data opening control section 332 notifies the processing's notifying section 2020 that the apparatus identifier is not stored on the permitted apparatus storing section 2130. The processing's notifying section 2020 notifies the user that the apparatus identifier is not stored on the permitted apparatus storing section 2130 by way of the processing's display section 300.

When the viewing or editing right is not given, the file data opening control section 332 may also notify the processing's notifying section 2020 that the viewing or editing right is not given. Specifically speaking, the file data opening control section 332 receives information, from the use control section 2200, which indicates that the viewing or editing right is not given. The processing's notifying section 2020 notifies the user that the viewing or editing right is not given by causing the processing's display section 300 to display thereon the information.

The following describes a case where two information processing apparatuses 2003 each change the contents displayed thereon in accordance with information indicating whether the display apparatus 20 is present or absent. In the following description, the two information processing apparatuses 2003 are referred to as a first information processing apparatus 2003 and a second information processing apparatus 2003. The word "first" is added to the names of the constituents of the first information processing apparatus 2003, and the word "second" is added to the names of the constituents of the second information processing apparatus 2003.

Based on the file identifier received form the display's communicating section 220, the first processing's display section 300 of the first information processing apparatus 2003 displays thereon the corresponding file data. In this case, if the second information processing apparatus 2003 issues a request to edit the file data currently used by the first information processing apparatus 2003, the use control section 2200 of the server 2006 identifies the first information processing apparatus 2003 with reference to the using apparatus information stored on the using apparatus storing section 2150. The use control section 2200 controls the first information processing apparatus 2003 to close the file data. Also, the use control section 2200 stores, as the using apparatus information, the information identifying the second information processing apparatus 2003 onto the using apparatus storing section 2150.

When the second file data opening control section 332 sets the status of the file data such that the second information processing apparatus 2003 can edit the file data, the first file data closing control section 334 sets the status of the file data such that the first information processing apparatus 2003 can not edit the file data under the control of the use control section 2200.

According to the present embodiment, the information processing apparatus 2003 can control opening/closing of the file data, with reference to the judgment whether the input file identifier is the same as the file identifier received from the display apparatus 20. Therefore, the present embodiment can prevent a third person without the display apparatus 20 from viewing the file data. Furthermore, the present embodiment can control viewing/editing of the file data based on the viewing or editing right associated with the file identifier. Therefore, the present embodiment can permit the file data to be viewed and edited in compliance with the importance of the file data.

Figure 12:
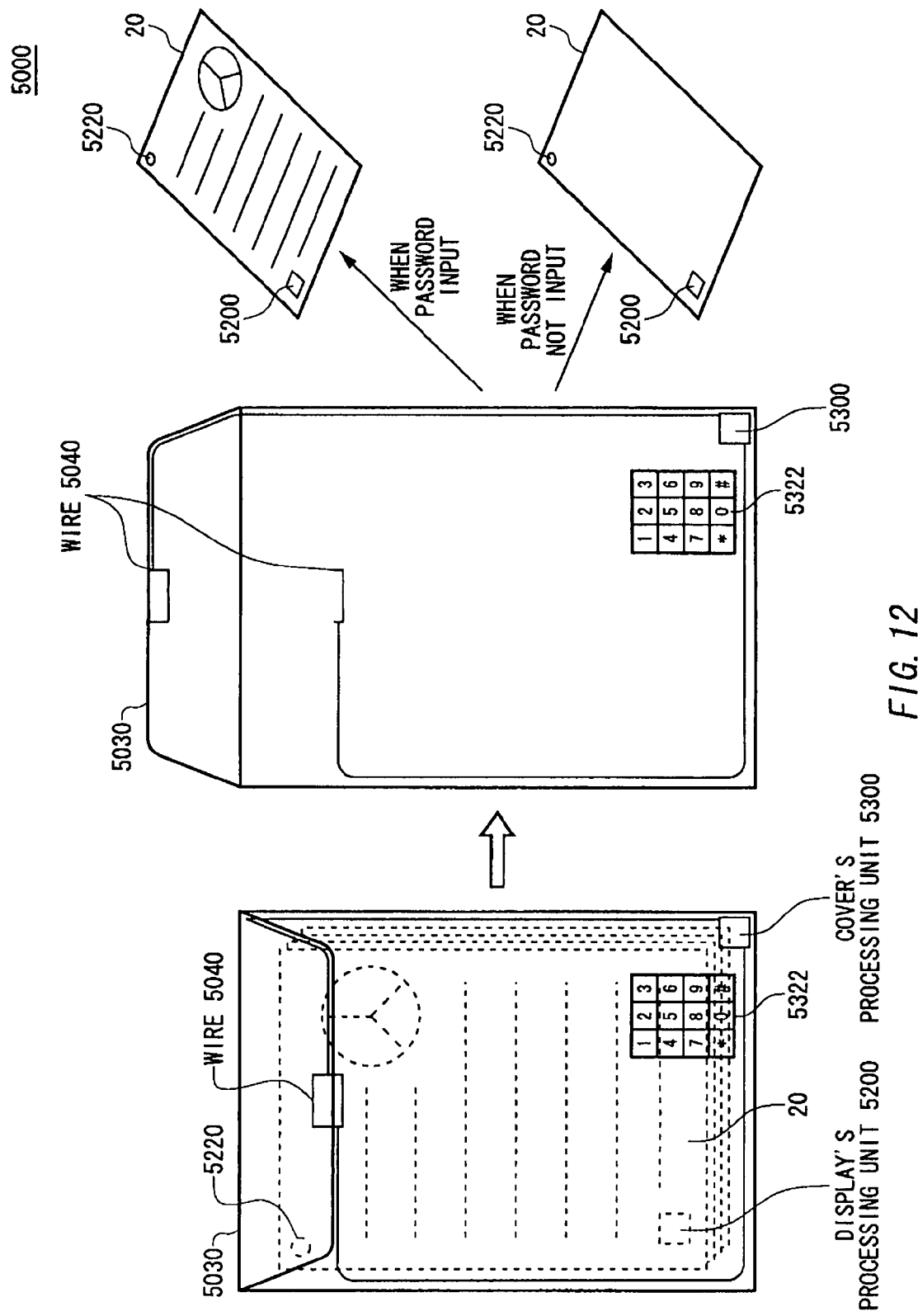
FIG. 12 is a schematic view illustrating a viewing management system 5000.

FIG. 12 is a schematic view illustrating a viewing management system 5000 relating to a third embodiment of the present invention. The viewing management system 5000 includes therein the display apparatus 20 and a viewing prevention cover 5030. The viewing prevention cover 5030 includes a wire 5040. The viewing management system 5000 relating to the third embodiment aims to automatically erase the data displayed on the display apparatus 20, when the viewing prevention cover 5030 is removed according to a procedure other than a predetermined procedure. Here, the predetermined procedure may indicate that, for example, the user enters a password into the viewing prevention cover 5030, and then removes the viewing prevention cover 5030 from the display apparatus 20. Alternatively, the predetermined procedure may indicate that the user removes the viewing prevention cover 5030 from the display apparatus 20 at a restricted location where the user is permitted to remove the viewing prevention cover 5030 from the display apparatus 20. As another alternative example, the predetermined procedure may indicate that the user enters a password into the viewing prevention cover 5030, and then cuts the viewing prevention cover 5030 to take out the display apparatus 20 out of the viewing prevention cover 5030.

The viewing prevention cover 5030 may have a shape like a bag, for example, an envelope-like shape, and enclose the display apparatus 20 therein so as to prevent the data displayed on the display's display section 5210 of the display apparatus 20 from being viewed. When the user inserts the display apparatus 20 displaying thereon predetermined data into the viewing prevention cover 5030 and closes the flap of the viewing prevention cover 5030, the wire 5040 provided in the viewing prevention cover 5030 is closed. Here, the wire 5040 may be arranged so as to be closed when the flap of the viewing prevention cover 5030 is closed, in a case where the viewing prevention cover 5030 has a bag-like shape. For example, the wire 5040 may be arranged such that, when the flap of the viewing prevention cover 5030 is closed, a portion of the wire 5040 which is positioned in the flap of the bag-like viewing prevention cover 5030 comes into contact with another portion of the wire 5040 which is positioned in the main part of the bag-like viewing prevention cover 5030 and the circuit including therein the wire 5040 is resultantly closed.

The cover's processing unit 5300 of the viewing prevention cover 5030 monitors the resistance value of the circuit including therein the wire 5040. When the resistance value of the wire 5040 becomes larger than the resistance value of the circuit including therein the wire 5040 which is observed when the flap of the viewing prevention cover 5030 is closed, the cover's processing unit 5300 judges that the viewing prevention cover 5030 is opened. In this case, the cover's processing unit 5300 may further judge that the display apparatus 20 is taken out of the viewing prevention cover 5030. For example, when the user inserts the display apparatus 20 into the viewing prevention cover 5030 and then closes the flap of the viewing prevention cover 5030, the wire 5040 is closed. When the user opens the viewing prevention cover 5030 afterwards, the wire 5040 is opened.

The resistance value of the wire 5040 is larger when the wire 5040 is opened than when the wire 5040 is closed. For this reason, by monitoring the resistance value of the wire 5040, the cover's processing unit 5300 can detect whether the viewing prevention cover 5030 is opened and judge whether the display apparatus 20 is taken out of the viewing prevention cover 5030. Here, the display apparatus 20 may include therein an optical sensor 5220. When the amount of light detected by the optical sensor 5220 is equal to or larger than the predetermined amount, the cover's processing unit 5300 may judge that the display apparatus 20 is taken out of the viewing prevention cover 5030.

The viewing prevention cover 5030 enables the user to input identification data, which is used to identify a user who is permitted to view the data displayed on the display apparatus 20. Here, the identification data may be a password, for example. The cover's processing unit 5300 enables the user to enter a password via an identification data input section 5322. The identification data input section 5322 may be, for example, a thin input apparatus with a ten-key numeric keypad. The identification data input section 5322 may be provided on the surface of the viewing prevention cover 5030. The cover's processing unit 5300 compares the password input by the user via the identification data input section 5322 with a password which is prestored on the cover's processing unit 5300. When the passwords match each other, the cover's processing unit 5300 obtains authentication information indicating that the passwords match each other, as viewing permission information which permits the user to view the data displayed on the display apparatus 20.

When judging that the display apparatus 20 is taken out of the viewing prevention cover 5030 before obtaining the viewing permission information, the cover's processing unit 5300 causes the display apparatus 20 to erase the data displayed thereon. For example, when the password input by the user via the identification data input section 5322 matches the password prestored on the cover's processing unit 5300, the cover's processing unit 5300 obtains, as the viewing permission information, the authentication information indicating that the passwords match each other. When the display apparatus 20 is taken out of the viewing prevention cover 5030 after the cover's processing unit 5300 obtains the viewing permission information, the cover's processing unit 5300 does not cause the display apparatus 20 to erase the data displayed thereon.

On the other hand, when the password input by the user via the identification data input section 5322 does not match the password prestored on the cover's processing unit 5300, the cover's processing unit 5300 does not obtain the viewing permission information. In this case, if the display apparatus 20 is taken out of the viewing prevention cover 5030, the cover's processing unit 5300 causes the display apparatus 20 to erase the data displayed thereon. Also, when the user takes the display apparatus 20 out of the viewing prevention cover 5030 without entering a password, the cover's processing unit 5300 does not obtain the viewing permission information, and therefore causes the display apparatus 20 to erase the data displayed thereon.

According to the viewing management system 5000 relating to the present embodiment the display region of the display apparatus 20 is covered with the viewing prevention cover 5030. When the viewing prevention cover 5030 is removed from the display apparatus 20 before the cover's processing unit 5300 obtains the viewing permission information, the viewing management system 5000 relating to the present embodiment can automatically erase the data displayed on the display apparatus 20. The above-described configuration only enables a user who is permitted to view the data displayed on the display apparatus 20 and knows the predetermined procedure to view the displayed data. As a result, the present embodiment can improve the security of the data displayed on the display apparatus 20.

Figure 13:
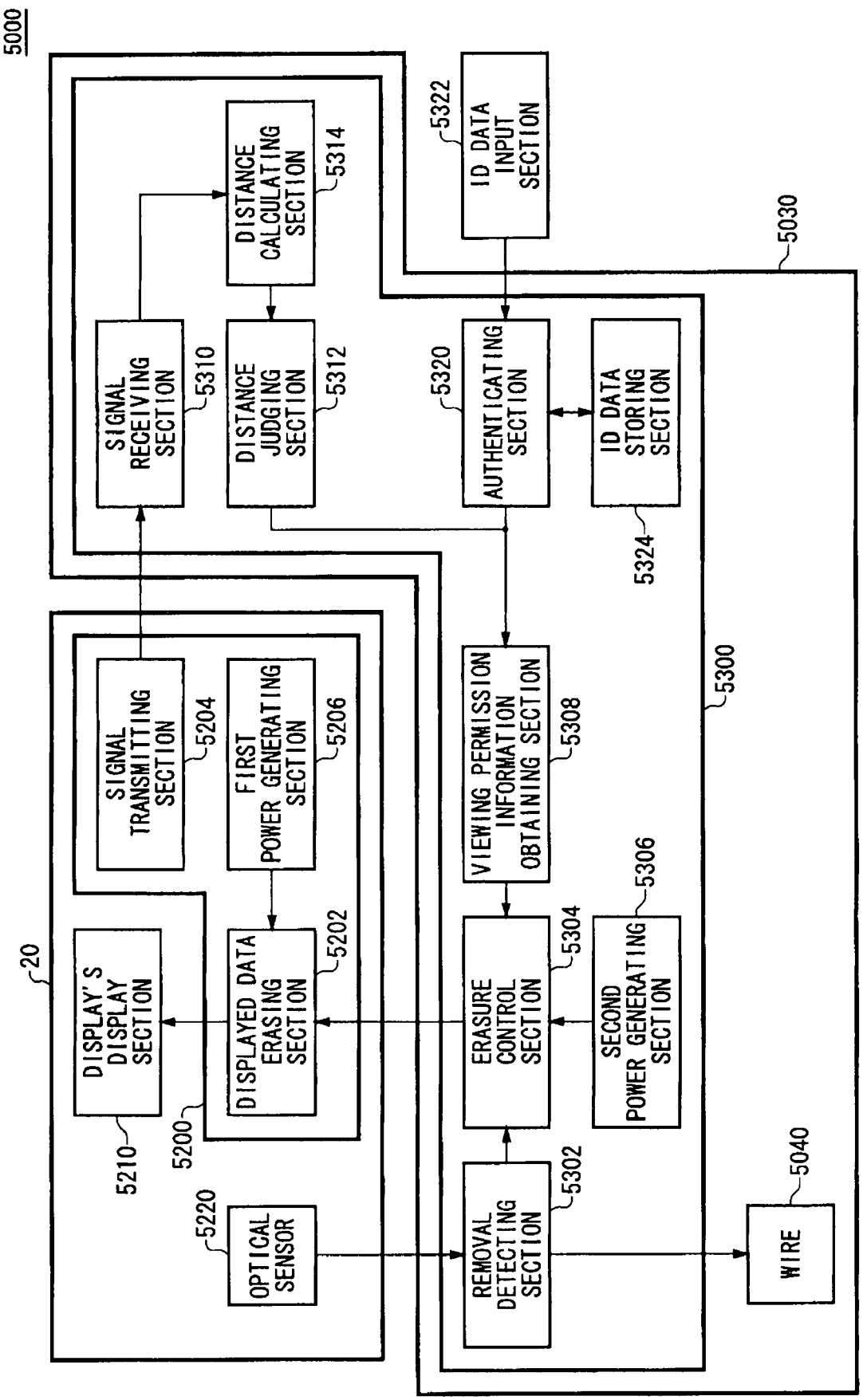
FIG. 13 illustrates the functional configuration of the viewing management system 5000.

FIG. 13 illustrates an exemplary functional configuration of the viewing management system 5000 relating to the present embodiment. The viewing management system 5000 includes therein the display apparatus 20 and viewing prevention cover 5030. The display apparatus 20 includes therein a display's processing unit 5200, a display's display section 5210, and the optical sensor 5220. The display's processing unit 5200 includes therein a displayed data erasing section 5202, a signal transmitting section 5204, and a first power generating section 5206. The viewing prevention cover 5030 includes therein the cover's processing unit 5300, identification data input section 5322, and wire 5040. The cover's processing unit 5300 includes therein a removal detecting section 5302, an erasure control section 5304, a second power generating section 5306, a viewing permission information obtaining section 5308, a signal receiving section 5310, a distance judging section 5312, a distance calculating section 5314, an authenticating section 5320, and an identification data storing section 5324.

The following first describes the exemplary functional configuration of the display apparatus 20. The display's display section 5210 visibly displays thereon data without power supply. Note that the display's display section 5210 may be configured by using any one of electronic paper, a flexible display, rewritable paper, a paper-like display, digital paper, electronic paper, an electronic sheet, and an electronic display sheet. The optical sensor 5220 is provided in the vicinity of the display's display section 5210, and detects the amount of light exposed thereto. The optical sensor 5220 may be provided in the vicinity of each of the four corners of the display's display section 5210. Alternatively, a plurality of optical sensors 5220 may be provided in the vicinity of the display's display section 5210.

As another alternative example, the optical sensors 5220 may be provided inside the viewing prevention cover 5030 at predetermined intervals. Specifically speaking, when the viewing prevention cover 5030 has a bag-like shape, the optical sensors 5220 may be provided inside the bag. To be more specific, the optical sensors 5220 may be positioned so as to be exposed to light when the bag-like viewing prevention cover 5030 is opened. For example, the optical sensors 5220 may be positioned in the vicinity of the opening of the bag-like viewing prevention cover 5030. When the viewing prevention cover 5030 is formed like a sheet, the optical sensors 5220 may be positioned along the edges of the viewing prevention cover 5030. To be specific, the optical sensors 5220 may be provided on the surface which comes in contact with the display's display section 5210. For example, the optical sensors 5220 may be positioned so as to be exposed to light when the viewing prevention cover 5030 is removed from the display's display section 5210. Here, the optical sensor 5220 notifies the removal detecting section 5302 of the detected amount of light. The optical sensor 5220 may notify the removal detecting section 5302 of the detected amount of light by means of wireless or wire communication.

The signal transmitting section 5204 is provided in the vicinity of the display's display section 5210. The signal transmitting section 5204 transmits a predetermined identification signal. The signal transmitting section 5204 may transmit the identification signal having a predetermined transmission intensity. The signal transmitting section 5204 may transmit the identification signal when the amount of light detected by the optical sensor 5220 becomes equal to or larger than a predetermined amount of light. In this case, the signal transmitting section 5204 detects that the amount of light detected by the optical sensor 5220 becomes equal to or larger than the predetermined amount of light and then transmits the identification signal. Here, the signal transmitting section 5204 may be positioned in the vicinity of each of the corners or edges of the display's display section 5210. Alternatively, a plurality of signal transmitting sections 5204 may be provided in the display's display section 5210.

The displayed data erasing section 5202 erases the data displayed on the display's display section 5210, under the control of the erasure control section 5304. For example, the displayed data erasing section 5202 erases the displayed data by simultaneously establishing connection with the writing lines of the display's display section 5210 which are arranged to form rows and columns and then supplying the same signal to all the writing lines. The first power generating section 5206 converts the light energy exposed thereto into electric power. The first power generating section 5206 supplies the generated electric power to the displayed data erasing section 5202. The first power generating section 5206 may be a solar battery, for example. The first power generating section 5206 may include therein a thin battery to supply electric power to the displayed data erasing section 5202 when not exposed to light. The thin battery may have a smaller thickness than the display apparatus 20. The first power generating section 5206 is shown as an example of a power generating section relating to the claims.

The functional configuration of the viewing prevention cover 5030 is next described. The viewing prevention cover 5030 may cover the display's display section 5210 in order to prevent the data displayed on the display's display section 5210 from being viewed. To be specific, the viewing prevention cover 5030 may be shaped like an envelope so as to enclose the display's display section 5210 therein, a binder so as to cover the display region of the display's display section 5210, or a sheet so as to cover the display region of the display's display section 5210. For example, the viewing prevention cover 5030 may be shaped like a bag so as to enclose the display's display section 5210 therein in order to prevent the data displayed on the display's display section 5210 from being viewed. The removal detecting section 5302 detects whether the viewing prevention cover 5030 is removed from the display's display section 5210. Specifically speaking, the removal detecting section 5302 detects whether the wire 5040 provided at a predetermined position in the viewing prevention cover 5030 is cut off.

For example, the wire 5040 may be positioned in the opening portion of the bag-like viewing prevention cover 5030. Here, the wire 5040 is connected to the removal detecting section 5302. The removal detecting section 5302 monitors the resistance value of the wire 5040. When the resistance value of the wire 5040 which is detected by the removal detecting section 5302 reaches a predetermined reference value or higher, the removal detecting section 5302 may detect that the wire 5040 is cut off, that is to say, that the circuit including therein the wire 5040 is opened. By detecting that the circuit including therein the wire 5040 is opened, the removal detecting section 5302 may determine that the viewing prevention cover 5030 is removed from the display's display section 5210.

Alternatively, the removal detecting section 5302 may detect whether the viewing prevention cover 5030 is removed from the display's display section 5210, based on the detected amount of light, which is received from the optical sensor 5220. To be specific, the removal detecting section 5302 detects that the viewing prevention cover 5030 is removed from the display's display section 5210, when the amount of light which is received from the optical sensor 5220 is equal to or larger thin the predetermined amount of light. When the optical sensor 5220 is provided inside the viewing prevention cover 5030, the removal detecting section 5302 detects that the viewing prevention cover 5030 is removed from the display's display section 5210 when light enters the inside of the viewing prevention cover 5030.

For example, when the user makes a cut in the viewing prevention cover 5030 and attempts to view the data displayed on the display's display section 5210 by flipping the cut portion, the optical sensor 5220 provided on the flipped portion detects the amount of light exposed thereto. When the amount of light detected by the optical sensor 5220 is equal to or larger than the predetermined amount of light, the removal detecting section 5302 detects that the viewing prevention cover 5030 is removed from the display's display section 5210. Here, the removal detecting section 5302 may cause a current or predetermined signal to be transmitted through the wire 5040. In this case, the removal detecting section 5302 may detect that the viewing prevention cover 5030 is removed from the display's display section 5210 when unable to obtain the current or predetermined signal from the wire 5040. Here, the removal detecting section 5302 may supply the current or predetermined signal to the wire 5040 in a complete manner. The removal detecting section 5302 supplies the information indicating that the viewing prevention cover 5030 is removed from the display's display section 5210, to the erasure control section 5304.

The identification data storing section 5324 stores thereon, in association with a user who is permitted to view the data displayed on the display's display section 5210, identification data used to identify the user. The identification data stored on the identification data storing section 5324 in association with the user may be, for example, a user identifier which uniquely identifies the user, a password which is defined in advance for the user, or biometric information of the user. Here, the biometric information may be voice print data of the user, fingerprint data of the user, the iris data of the user, information indicating the vein patterns of the fingers of the user, or the like. The identification data storing section 5324 supplies the identification data stored in association with the user, to the authenticating section 5320, under the control of the authenticating section 5320.

The identification data input section 5322 enables the user to input identification data. When the identification data is character string information such as a password, the identification data input section 5322 may be an input apparatus such as a ten-key numeric keypad. When the identification data is biometric information, the identification data input section 5322 may be a fingerprint input apparatus, a voice input apparatus, a vein pattern identifying apparatus, or the like. The identification data input section 5322 supplies the identification data input by the user to the authenticating section 5320. The authenticating section 5320 compares the identification data received from the identification data input section 5322 with the identification data stored on the identification data storing section 5324 in association with the user. When the identification data received from the identification data input section 5322 matches the identification data stored on the identification data storing section 5324 in association with the user, the authenticating section 5320 outputs the authentication information to the viewing permission information obtaining section 5308.

The signal receiving section 5310 is provided in the viewing prevention cover 5030, and receives the identification signal transmitted from the signal transmitting section 5204. The signal receiving section 5310 supplies the reception intensity of the identification signal which is detected when receiving the identification signal, to the distance calculating section 5314. By means of the reception intensity of the identification signal which is received from the signal receiving section 5310, the distance calculating section 5314 calculates the distance between the viewing prevention cover 5030 and the display's display section 5210. The distance calculating section 5314 supplies the calculated distance between the viewing prevention cover 5030 and the display's display section 5210, to the distance judging section 5312. When the distance received from the distance calculating section 5314 is equal to or shorter than a predetermined distance, the distance judging section 5312 outputs distance information to the viewing permission information obtaining section 5308.

Here, the viewing prevention cover 5030 may further include therein a time obtaining section and a period judging section. The time obtaining section obtains a time, and the period judging section judges whether the time obtained by the time obtaining section is within a period during which the viewing prevention cover 5030 is permitted to be removed from the display's display section 5210. To be specific, the time obtaining section obtains the time by receiving a standard wave including therein information indicating the time. The time obtaining section supplies the obtained time to the period judging section. The period judging section judges whether the time obtained by the time obtaining section is within a predetermined period during within the viewing prevention cover 5030 is permitted to be removed from the display's display section 5210. When judging that the time obtained by the time obtaining section is within the predetermined period, the period judging section outputs time information to the viewing permission information obtaining section 5308.

The viewing permission information obtaining section 5308 obtains the viewing permission information which indicates that the user is permitted to view the data displayed on the display's display section 5210. For example, the viewing permission information obtaining section 5308 obtains the authentication information from the authenticating section 5320, as the viewing permission information. Alternatively, the viewing permission information obtaining section 5308 may obtain the distance information from the distance judging section 5312, as the viewing permission information. As another alternative example, the viewing permission information obtaining section 5308 may obtain the time information from the period judging section as the viewing permission information. It should be noted that the viewing permission information obtaining section 5308 may obtain, as the viewing permission information, one of or a combination of at least two of the authentication information, distance information, and time information. The viewing permission information obtaining section 5308 supplies, to the erasure control section 5304, information indicating that the viewing permission information is obtained, in association with the date and time of obtaining the viewing permission information.

When receiving from the removal detecting section 5302 information indicating that the viewing prevention cover 5030 is removed from the display's display section 5210 before receiving the viewing permission information from the viewing permission information obtaining section 5308, the erasure control section 5304 causes the display apparatus 20 to erase the data displayed on the display's display section 5210. Specifically speaking, the erasure control section 5304 makes a request to the displayed data erasing section 5202 to erase the data displayed on the display's display section 5210. For example, when the wire 5040 is cut off before receiving the viewing permission information from the viewing permission information obtaining section 5308, the erasure control section 5304 causes the displayed data erasing section 5202 to erase the data displayed on the display's display section 5210.

When receiving information from the removal detecting section 5302 which indicates that the viewing prevention cover 5030 is removed from the display's display section 5210 before obtaining the authentication information from the viewing permission information obtaining section 5308, the erasure control section 5304 may cause the display apparatus 20 to erase the data displayed on the display's display section 5210. As another alternative example, when receiving information from the removal detecting section 5302 which indicates that the viewing prevention cover 5030 is removed from the display's display section 5210 before obtaining the distance information from the viewing permission information obtaining section 5308, the erasure control section 5304 may cause the display apparatus 20 to erase the data displayed on the display's display section 5210. As another alternative example, when receiving information from the removal detecting section 5302 which indicates that the viewing prevention cover 5030 is removed from the display's display section 5210 before obtaining the time information from the viewing permission information obtaining section 5308, the erasure control section 5304 may cause the display apparatus 20 to erase the data displayed on the display's display section 5210.

The second power generating section 5306 generates electric power which is to be required by the erasure control section 5304 to control the displayed data erasing section 5202 to erase the data displayed on the display's display section 5210. To be specific, the second power generating section 5306 converts the light energy exposed thereto into electric power. For example, the second power generating section 5306 may be a solar battery. The erasure control section 5304 uses the power generated by the second power generating section 5306 based on the light energy conversion in order to control the displayed data erasing section 5202. Here, the second power generating section 5306 is shown as an example of the power generating section relating to the claims.

The viewing management system 5000 relating to the present embodiment can automatically erase the data displayed on the display's display section 5210, when detecting that the viewing prevention cover 5030 is removed from the display's display section 5210 before obtaining the information indicating that the data displayed on the display's display section 5210 is permitted to be viewed, for example, a password. With this configuration, for example, the present embodiment only enables the user who has permission to view the data displayed on the display's display section 5210 to view the displayed data. As a consequence, the present embodiment can improve the security of the displayed data.

Furthermore, the viewing management system 5000 relating to the present embodiment can automatically erase the data displayed on the display apparatus 20, when the distance between the display apparatus 20 and the viewing prevention cover 5030 reaches a predetermined distance. With this configuration, by fixing the position of the viewing prevention cover 5030 to a predetermined position, the present embodiment can prevent the user from taking the display apparatus 20 out of the viewing prevention cover 5030, and talking the display apparatus 20 to a position which is distant from the viewing prevention cover 5030 by the predetermined distance.

Figure 14:
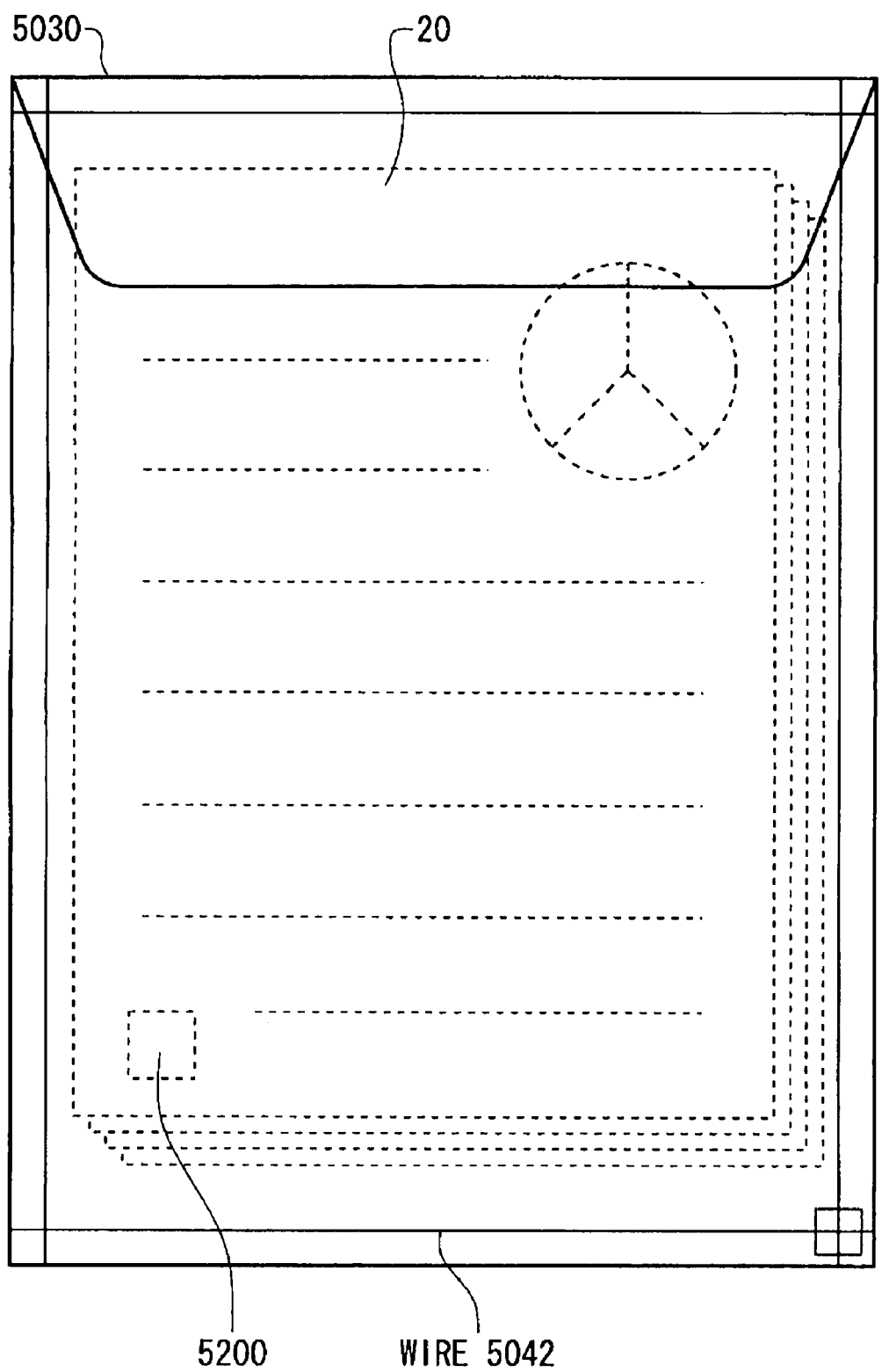
FIG. 14 illustrates the position of a wire 5042.

FIG. 14 illustrates an example of the position of a wire 5042 relating to another embodiment of the present invention. The wire 5042 may be arranged so as to run along the edges of the viewing prevention cover 5030. Here, the viewing prevention cover 5030 may have a bag-like shape. Specifically speaking, the wire 5042 is arranged in the vicinity of more than one of the sides of the viewing prevention cover 5030 so as to run along the sides. For example, the wire 5042 may be arranged in the vicinity of the four sides of the viewing prevention cover 5030 so as to run along the four sides. Alternatively, the wire 5042 may be arranged in the vicinity of at least one of the four sides of the viewing prevention cover 5030 so as to run along the side. It is preferable that the wire 5042 is provided at such a position that the wire 5042 is likely to be cut off when the bag-like viewing prevention cover 5030 is opened.

Also, the wire 5042 may be provided at such a position that the circuit including therein the wire 5042 is closed when the display apparatus 20 is inserted into the viewing prevention cover 5030 and the flap of the viewing prevention cover 5030 is then closed. For example, the portions of the wire 5042 may be respectively positioned in the flap portion and main portion of the viewing prevention cover 5030. In this case, the wire 5042 may be arranged so that, when the flap of the viewing prevention cover 5030 is closed, the portions of the wire 5042 which are respectively positioned in the flap and main portions of the viewing prevention cover 5030 come in contact with each other and the circuit including therein the wire 5042 is resultantly closed.

The removal detecting section 5302 of the cover's processing unit 5300 monitors the resistance value of the circuit including therein the wire 5042. When the resistance value of the circuit including therein the wire 5042 reaches a predetermined value or higher, the removal detecting section 5302 determines that the viewing prevention cover 5030 is removed from the display's display section 5210. For example, a case is assumed where the user does not input the identification data such as a password into the cover's processing unit 5300. In this case, the cover's processing unit 5300 does not obtain the viewing permission information. When the user makes a cut in the viewing prevention cover 5030 and takes out the display apparatus 20 from the viewing prevention cover 5030, the wire 5042 is cut. When the resistance value of the circuit including therein the wire 5042 accordingly reaches the predetermined value or higher, the cover's processing unit 5300 makes a request to the display's processing unit 5200 to erase the data displayed on the display apparatus 20.

Here, if the viewing prevention cover 5030 is cut (for example, torn off), it is preferable that the wire 5042 has a strength equal to or lower than the strength of the material of the viewing prevention cover 5030. In other words, the strength of the wire 5042 may be adjusted so that, when the viewing prevention cover 5030 is cut, the wire 5042 is also cut. For example, when the viewing prevention cover 5030 is made of paper, the strength of the wire 5042 may be adjusted so that, when the viewing prevention cover 5030 is cut, the wire 5042 is also cut. Furthermore, the strength of the wire 5042 may be adjusted such that the user does not notice that the wire 5042 is provided in the viewing prevention cover 5030 when cutting the viewing prevention cover 5030.

When the wire 5042 relating to the present embodiment is positioned as disclosed above, the data displayed on the display apparatus 20 can be automatically erased when the user cuts the viewing prevention cover 5030 and takes out the display apparatus 20 without inputting authentication data such as a password into the viewing prevention cover 5030. As a result, the present embodiment can prevent the data displayed on the display apparatus 20 from being illegally viewed.

Figure 15:
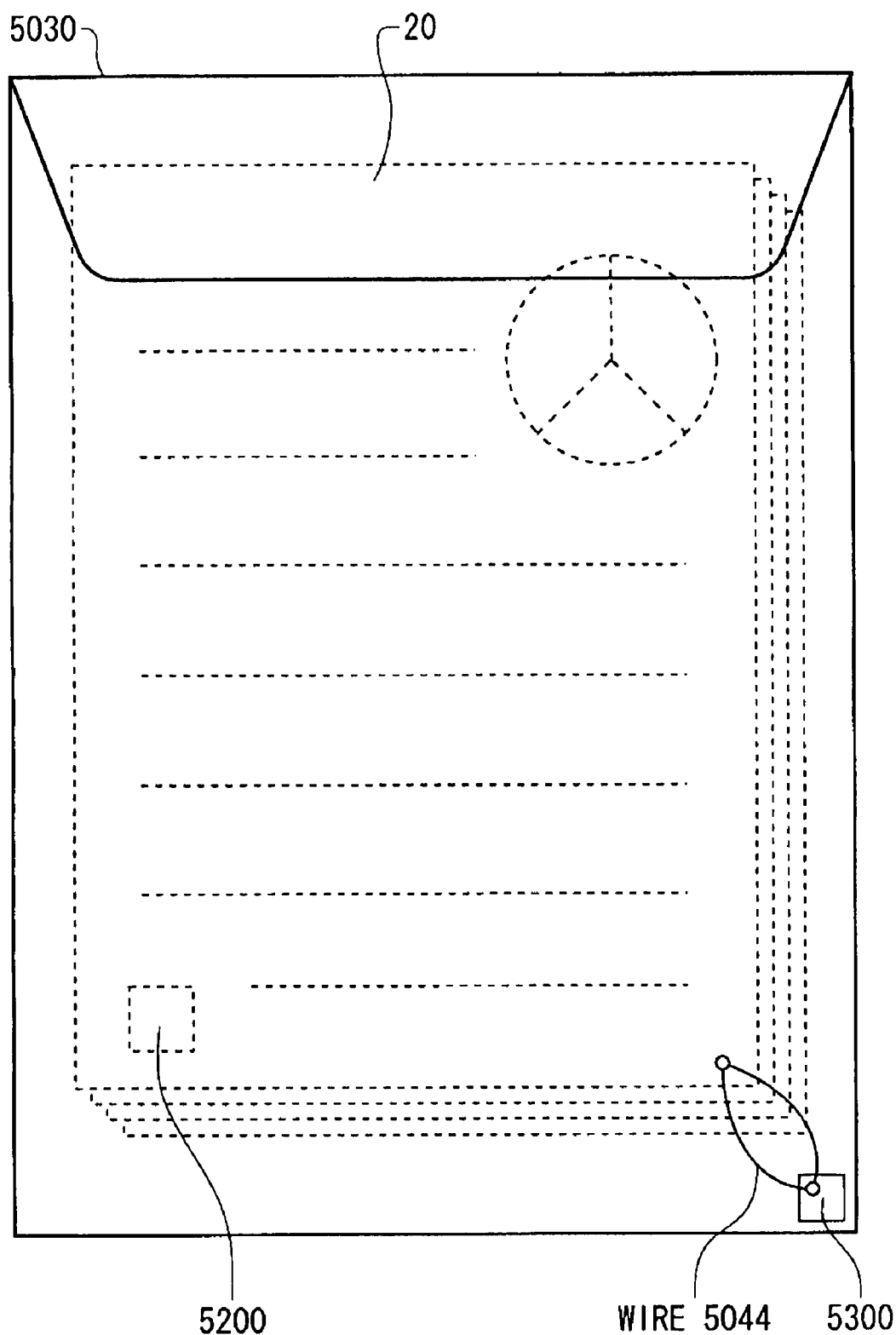
FIG. 15 illustrates the position of a wire 5044.

FIG. 15 illustrates one example of the position of a wire 5044 relating to another embodiment of the present invention. The viewing prevention cover 5030 may be shaped like a bag. The wire 5044 may connect the corner of the display apparatus 20 and the cover's processing unit 5300 to each other. To be specific, the end of the wire 5044 which is connected to the display apparatus 20 has a shape of a clip. When the display apparatus 20 is inserted into the viewing prevention cover 5030, the clip-like end of the wire 5044 holds the display apparatus 20. Here, the clip-like end of the wire 5044 may have a mechanical contact which closes the circuit including therein the wire 5044 when the display apparatus 20 is inserted into the viewing prevention cover 5030.

Here, the display apparatus 20 may be held by a plurality of clips which are connected to the wire 5044. For example, the corners of the display apparatus 20 may be respectively held by the plurality of clips. The force with which the clips hold the display apparatus 20 may be preferably adjusted so that the clips connected to the wire 5044 are detached from the viewing prevention cover 5030 by a force applied by the user to the display apparatus 20 in order to take the display apparatus 20 out of the viewing prevention cover 5030. The clips may be mechanical contacts which open the circuit including therein the wire 5044 when the display apparatus 20 is inserted into the viewing prevention cover 5030.

The removal detecting section 5302 of the cover's processing unit 5300 monitors the resistance value of the circuit including therein the wire 5044. When the resistance value of the circuit including therein the wire 5044 reaches a predetermined value or higher, the removal detecting section 5302 determines that the viewing prevention cover 5030 is removed from the display's display section 5210. For example, a case is assumed where the user does not input the identification data such as a password into the cover's processing unit 5300. In this case, the cover's processing unit 5300 does not obtain the viewing permission information. When the user takes out the display apparatus 20 from the viewing prevention cover 5030, the wire 5044 is opened.

When the resistance value of the circuit including therein the wire 5044 accordingly reaches the predetermined value or higher, the cover's processing unit 5300 makes a request to the display's processing unit 5200 to erase the data displayed on the display apparatus 20. The cover's processing unit 5300 may transmit an erasure instruction by means of wireless communication to the display's processing unit 5200. When receiving the erasure instruction from the cover's processing unit 5300, the display's processing unit 5200 may erase the data displayed on the display apparatus 20.

Here, it is assumed that the clips have mechanical contacts which open the circuit including therein the wire 5044 when the display apparatus 20 is inserted into the viewing prevention cover 5030. In this case, when the resistance value of the circuit including therein the wire 5044 becomes equal to or lower than a predetermined value, the removal detecting section 5302 may determine that the viewing prevention cover 5030 is removed from the display's display section 5210. When the resistance value of the circuit including therein the wire 5044 becomes equal to or lower than the predetermined value, the cover's processing unit 5300 may make a request to the display's processing unit 5200 to erase the data displayed on the display apparatus 20.

Figure 16:
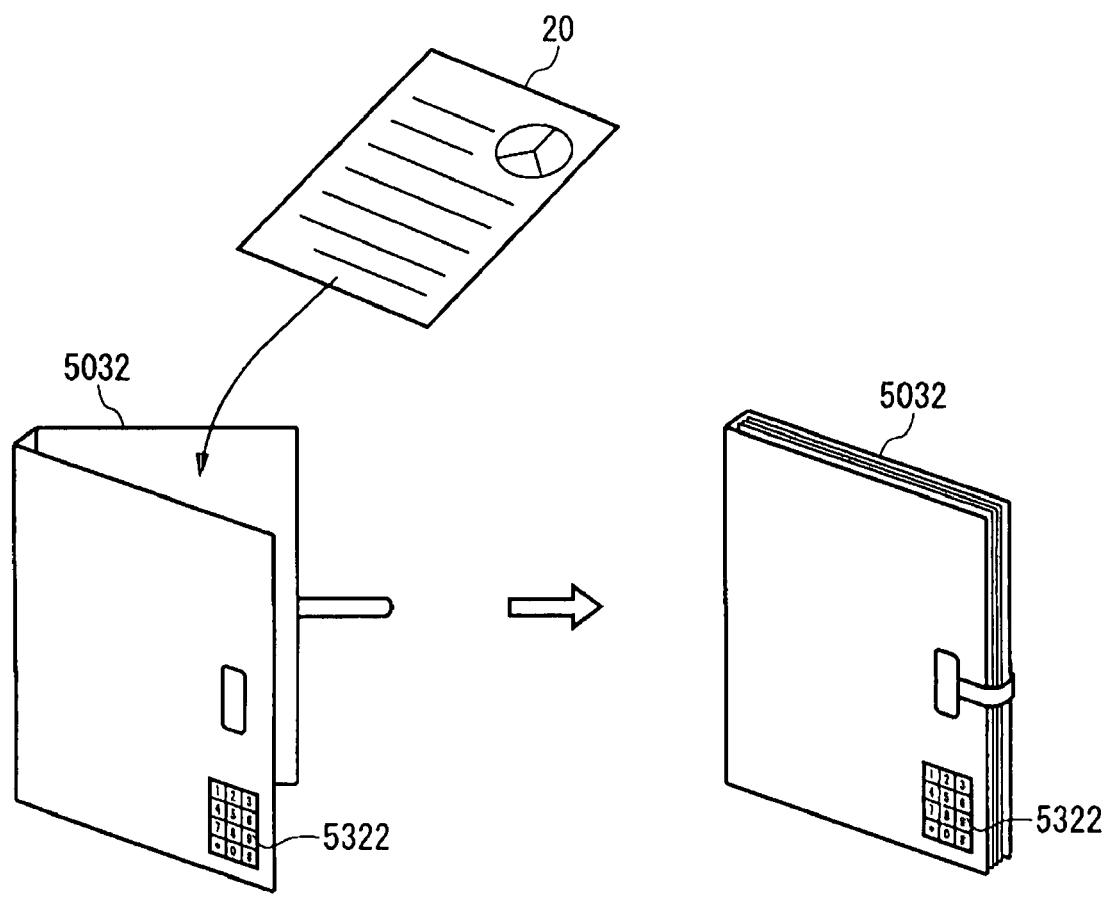
FIG. 16 illustrates a viewing prevention cover 5032.

FIG. 16 illustrates one example of a viewing prevention cover 5032 relating to another embodiment of the present invention. The viewing prevention cover 5032 may have some or all of the functions and constituents of the viewing prevention cover 5030 and wires 5042 and 5044 which are described with reference to FIGS. 12 to 15. The viewing prevention cover 5032 relating to the present embodiment may be shaped like a binder to cover the display apparatus 20 in order to prevent the data displayed on the display apparatus 20 from being viewed. To be specific, the viewing prevention cover 5032 sandwiches the display apparatus 20 therein to prevent the data displayed on the display apparatus 20 from being viewed. Here, the viewing prevention cover 5032 may have a fastener, in which the wire 5040 may be provided. For example, the wire 5040 may be positioned so as to be closed when the display apparatus 20 is sandwiched within the viewing prevention cover 5032 and the fastener of the viewing prevention cover 5032 is fastened.

When the display apparatus 20 is sandwiched within the viewing prevention cover 5032 and the viewing prevention cover 5032 is closed, the wire 5040 provided in the viewing prevention cover 5032 is closed. The cover's processing unit 5300 monitors the resistance value of the circuit including therein the wire 5040 to detect whether the display apparatus 20 is detached from the viewing prevention cover 5032. When the user opens the viewing prevention cover 5032 and takes the display apparatus 20 out without inputting the identification data such as a password into the identification data input section 5322, the cover's processing unit 5300 causes the display apparatus 20 to erase the data displayed thereon.

Figure 17:
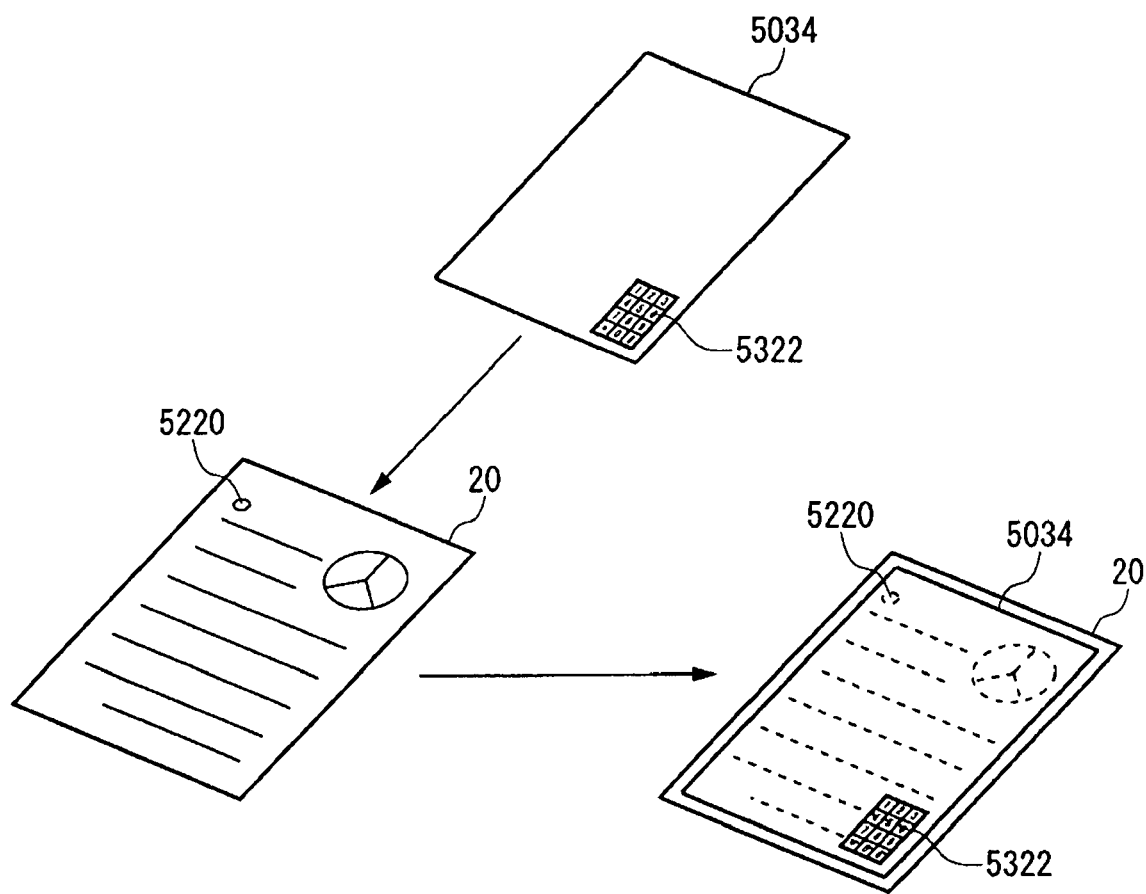
FIG. 17 illustrates a viewing prevention cover 5034.

FIG. 17 illustrates one example of a viewing prevention cover 5034 relating to another embodiment of the present invention. The viewing prevention cover 5034 may have some or all of the functions and constituents of the viewing prevention cover 5030 and wires 5042 and 5044 which are described with reference to FIGS. 12 to 15. The viewing prevention cover 5034 may be shaped like a sheet to cover the display region of the display apparatus 20 in order to prevent the data displayed on the display apparatus 20 from being viewed. To be specific, the viewing prevention cover 5034 covers the display region of the display apparatus 20 to prevent the data displayed on the display apparatus 20 from being viewed. Furthermore, the optical sensor 5220 may be provided at a predetermined position in the display apparatus 20. For example, the optical sensor 5220 may be positioned so as to be covered by the viewing prevention cover 5034 when the display apparatus 20 is covered by the viewing prevention cover 5034.

When the viewing prevention cover 5034 covers the display region of the display apparatus 20, the optical sensor 5220 provided in the display apparatus 20 is covered by the viewing prevention cover 5034. The cover's processing unit 5300 receives the amount of light detected by the optical sensor 5220 to detect whether the viewing prevention cover 5034 is removed from the display apparatus 20. For example, it is assumed that the user does not input the identification data such as a password into the identification data input section 5322. When the user removes the viewing prevention cover 5034, the optical sensor 5220 is exposed to light. When the amount of light detected by the optical sensor 5220 accordingly becomes equal to or larger than the predetermined amount of light, the cover's processing unit 5300 causes the display apparatus 20 to erase the data displayed thereon.

Figure 18:
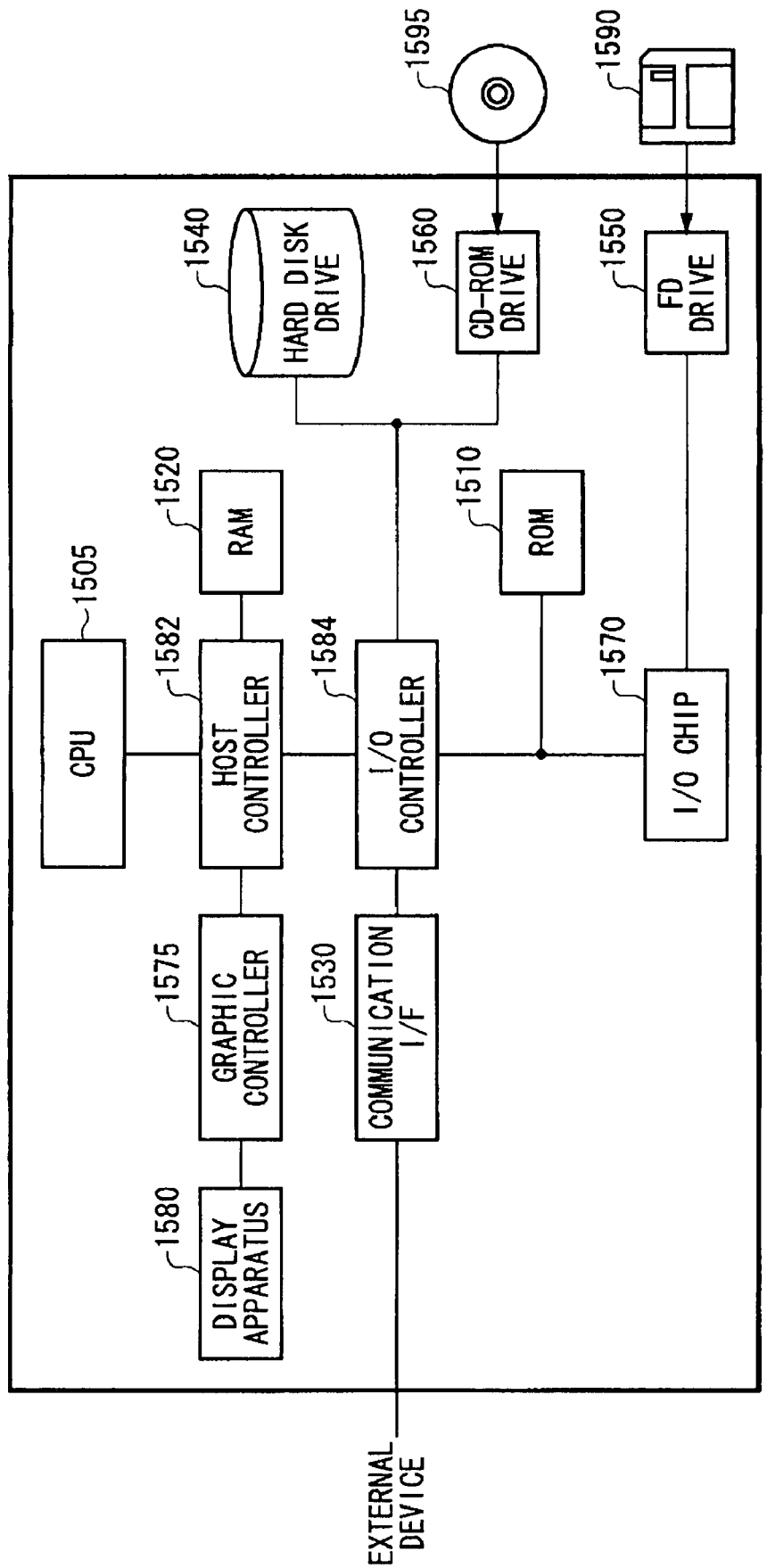
FIG. 18 illustrates the hardware configuration of a computer system.

FIG. 18 illustrates an exemplary hardware configuration of a computer system relating to an embodiment of the present invention. The computer system relating to the present embodiment is constituted by a CPU surrounding section, an input/output (I/O) section and a legacy I/O section. The CPU surrounding section includes a CPU 1505, a RAM 1520, a graphic controller 1575, and a display device 1580 which are connected to each other by means of a host controller 1582. The I/O section includes a communication interface (I/F) 1530, a hard disk drive 1540, and a CD-ROM drive 1560 which are connected to the host controller 1582 by means of an I/O controller 1584. The legacy I/O section includes a ROM 1510, a flexible disk drive 1550, and an I/O chip 1570 which are connected to the I/O controller 1584.

The host controller 1582 connects the RAM 1520 with the CPU 1505 and graphic controller 1575 which access the RAM 1520 at a high transfer rate. The CPU 1505 operates in accordance with programs stored on the ROM 1510 and RAM 1520, to control the constituents. The graphic controller 1575 obtains image data which is generated by the CPU 1505 or the like on a frame buffer provided within the RAM 1520, and causes the display device 1580 to display the obtained image data. Alternatively, the graphic controller 1575 may include therein a frame buffer for storing thereon image data generated by the CPU 1505 or the like.

The I/O controller 1584 connects, to the host controller 1582, the communication interface 1530, hard disk drive 1540 and CD-ROM drive 1560 which are I/O devices operating at a relatively high rate. The communication interface 1530 communicates with a difference device via a network. The hard disk drive 1540 stores thereon programs and data to be used by the CPU 1505 provided in the computer system. The CD-ROM drive 1560 reads programs and data from a CR-ROM 1595, and supplies the read programs and data to the hard disk drive 1540 via the RAM 1520.

The I/O controller 1584 is also connected to the ROM 1510, flexible disk drive 1550 and I/O chip 1570 which are I/O devices operating at a relatively low rate. The ROM 1510 stores thereon a boot program executed by the computer system at the start up, programs unique to the hardware of the computer system, and the like. The flexible disk drive 1550 reads programs and data from a flexible disk 1590, and supplies the read programs and data to the hard disk drive 1540 via the RAM 1520. The I/O chip 1570 is used to connect a variety of I/O devices such as the flexible disk drive 1550 via, for example, a parallel port, a serial port, a keyboard port, a mouse port or the like.

A program to be supplied to the hard disk drive 1540 via the RAM 1520 is provided by a user in a state of being stored on a recording medium such as the flexible disk 1590, CD-ROM 1595 and an IC card. The program is read from the recording medium, installed via the RAM 1520 in the hard disk drive 1540 in the computer system, and executed by the CPU 1505.

The program to be installed in and thus executed by the computer system causes the CPU 1505 and the like to operate the computer system as at least some of the display's display section 200, display's display control section 210, display's communicating section 220, storing unit 230, file identifier storing section 232, update storing section 234, power receiving section 240, processing's display section 300, processing's display control section 310, first processing's communicating section 320, file data control unit 330, file data opening control section 332, file data closing control section 334, file data obtaining section 340, editing control section 350, update judging section 360, update notifying section 362, editing instruction obtaining section 370, information input section 374, file data storing section 390, power feeding section 400 and power feeding control section 410 described with reference to FIGS. 1 to 6.

The program to be installed in and thus executed by the computer system may cause the CPU 1505 and the like to operate the computer system as at least some of the display's display section 200, display's display control section 210, display's communicating section 220, storing unit 230, file identifier storing section 232, update storing section 234, power receiving section 240, processing's display section 300, processing's display control section 310, first processing's communicating section 320, file data control unit 330, file data opening control section 332, file data closing control section 334, file data obtaining section 340, editing control section 350, update judging section 360, update notifying section 362, editing instruction obtaining section 370, information input section 374, file data storing section 390, power feeding section 400, power feeding control section 410, electronic paper detecting section 2010, processing's notifying section 2020, second processing's communicating section 2030, server's communicating section 2110, file storing section 2120, permitted apparatus storing section 2130, right storing section 2140, using apparatus storing section 2150, and use control section 2200 described with reference to FIGS. 7 to 11.

The program to be installed in and thus executed by the computer system may cause the CPU 1505 and the like to operate the computer system as at least some of the display's processing unit 5200, displayed data erasing section 5202, signal transmitting section 5204, first power generating section 5206, display's display section 5210, cover's processing unit 5300, removal detecting section 5302, erasure control section 5304, second power generating section 5306, viewing permission information obtaining section 5308, signal receiving section 5310, distance judging section 5312, distance calculating section 5314, authenticating section 5320, identification data input section 5322, and identification data storing section 5324 described with reference to FIGS. 12 to 17.

While one aspect of the present invention has been described based on the embodiments, the technical scope of the invention is not limited to the above-described embodiments. It is apparent to persons skilled in the art that various alternations and improvements can be added to the above-described embodiments. It is also apparent from the scope of the claims that the embodiments added with such alternations or improvements can be included in the technical scope of the invention.

What is claimed is:

1. A display system comprising:
   a display apparatus that displays thereon file data; and
   a first information processing apparatus that manages editing or viewing of the file data by a user, wherein
   the display apparatus comprising:
   a file identifier storing section that stores thereon a file identifier identifying the file data;
   a display's communicating section that transmits the file identifier stored on the file identifier storing section to the first information processing apparatus, and receives the file data identified by the file identifier stored on the file identifier storing section; and
   a display's display section that displays thereon the file data received by the display's communicating section, and
   the first information processing apparatus comprising:
   a first file data obtaining section that obtains the file data identified by the file identifier transmitted from the display's communicating section, and transmits the obtained file data to the display apparatus;
   a first file data opening control section that opens the file data obtained by the first file data obtaining section to enable the user to edit or view the file data;
   a first file data closing control section that closes the file data which has been opened by the first file data opening control section to prohibit the user from editing or viewing the file data, when no access is made to the file data which has been opened by the first file data opening control section for a predetermined first time period; and
   a processing's communicating section that receives the file identifier which is stored on the file identifier storing section and transmitted from the display's communicating section,
   wherein the display's communicating section transmits the file identifier stored on the file identifier storing section at intervals of a predetermined second time period only when the display apparatus is positioned within a predetermined range, and
   wherein the first file data closing control section closes the file data which has been opened by the first file data opening control section if the processing's communicating section does not receive the file identifier from the display's communicating section for a predetermined third time period which is longer than the second time period.

2. The display system as set forth in claim 1, wherein
   when the first file data opening control section opens the file data obtained by the first file data obtaining section to enable the user to edit and view the file data,
   the first file data closing control section sets a status of the file data which has been opened by the first file data opening control section to a read-only status in order to prohibit the user from editing the file data, if no access is made to the file data which has been opened by the first file data opening control section for a predetermined fourth time period which is shorter than the first time period.

3. The display system as set forth in claim 1, wherein
   the display apparatus is electronic paper which keeps the file data visibly displayed thereon without power supply.

4. The display system as set forth in claim 1, wherein:
the display apparatus further comprises:
an update storing section that stores thereon an update date and an update time of the file data displayed on the display's display section,
wherein the display's communicating section further transmits the update date and time stored on the update storing section to the first information processing apparatus,
the first information processing apparatus further comprises:
an update judging section that judges whether the file data displayed on the display's display section has been updated, with reference to the update date and time which are transmitted from the display's communicating section and an update date and an update time of the file data which are obtained by the first file data obtaining section; and
an update notifying section that, when the update judging section judges that the file data has been updated, supplies, to the display apparatus, update information indicating that the file data displayed on the display's display section has been updated, and
wherein the display's display section displays thereon the update information supplied by the update notifying section.

5. The display system as set forth in claim 1, wherein:
the file identifier storing section stores thereon the file identifier identifying the file data that indicates an electronic medical record of a patient,
the display's communicating section transmits the file identifier stored on the file identifier storing section to the first information processing apparatus, and receives the file data that indicates the electronic medical record which is identified by the file identifier stored on the file identifier storing section, and
the display's display section displays thereon the file data that indicates the electronic medical record which is received from the display's communicating section.

6. The display system as set forth in claim 1, further comprising:
a power feeding apparatus that generates a magnetic field within the predetermined range so as to feed power to the display apparatus, wherein
wherein the display apparatus further comprises:
a power receiving section that receives the power from the magnetic filed generated by the power feeding apparatus, and
wherein when the display apparatus is placed within the predetermined range and the power receiving section receives the power, the display's communicating section uses the received power to transmit the file identifier stored on the file identifier storing section to the first information processing apparatus and receive the file data identified by the file identifier stored on the file identifier storing section.

7. The display system as set forth in claim 1, wherein:
the first information processing apparatus further comprises:
an information input section that receives a file identifier identifying file data, which is designated by the user; and
an electronic paper detecting section that detects whether the file identifier transmitted from the display's communicating section is the same as the file identifier received by the information input section, and wherein when the electronic paper detecting section detects that the file identifier transmitted from the display's communicating section is the same as the file identifier received by the information input section, the first file data opening control section opens the file data obtained by the first file data obtaining section to enable the user to edit or view the file data.

8. The display system as set forth in claim 7,
wherein after the first file data opening control section opens the file data, the electronic paper detecting section detects whether the same file identifier is transmitted thereto from the display's communicating section at intervals of the predetermined second time period, and
wherein when the electronic paper detecting section detects that the same file identifier is not transmitted thereto from the display's communicating section, the first file data closing control section closes the file data which has been opened by the first file data opening control section to prohibit the user from editing or viewing the file data.

9. The display system as set forth in claim 8, further comprising
a right storing section that stores thereon, in association with the file identifier, an editing or viewing right of the corresponding file data which is varied depending on whether the same file identifier is transmitted from the display's communicating section,
wherein the first file data opening control section and first file data closing control section respectively open and close the file data in accordance with the editing or viewing right stored on the right storing section.

10. The display system as set forth in claim 1, further comprising
a second information processing apparatus that manages editing or viewing of the file data by a user,
wherein the second information processing apparatus comprises:
a second file data obtaining section that obtains the file data identified by the file identifier transmitted from the display's communicating section and transmits the obtained file data to the display apparatus;
a second file data opening control section that opens the file data obtained by the second file data obtaining section to enable the user to edit or view the file data; and
a second file data closing control section that closes the file data which has been opened by the second file data opening control section to prohibit the user from editing or viewing the file data, when no access is made to the file data which has been opened by the second file data opening control section for the predetermined first time period, and
wherein when the second file data opening control section enables the user to edit the file data on the second information processing apparatus, the first file data closing control section prohibits the user from editing the file data on the first information processing apparatus.

11. The display system as set forth in claim 1, further comprising:
a permitted apparatus storing section that stores thereon, in association with the file identifier, an apparatus identifier identifying an information processing apparatus which is permitted to edit or view the file data identified by the file identifier,
wherein the first file data opening control section opens the file data to enable the user to edit or view the file data, under a condition that an apparatus identifier identifying the first information processing apparatus is stored on the permitted apparatus storing section in association with the file identifier transmitted from the display's communicating section.

12. The display system as set forth in claim 11, wherein the first information processing apparatus further comprises:
a processing's notifying section that, when the apparatus identifier identifying the first information processing apparatus is not stored on the permitted apparatus storing section in association with the file identifier transmitted from the display's communicating section, notifies the user that the apparatus identifier identifying the first information processing apparatus is not stored on the permitted apparatus storing section in association with the file identifier transmitted from the display's communicating section.

13. A display program for a display system,
the display system comprising:
a display apparatus that displays thereon file data; and
a information processing apparatus that manages editing or viewing of the file data by a user, wherein
the display program causes the display system to function as:
a file identifier storing section that stores thereon a file identifier identifying the file data;
a display's communicating section that transmits the file identifier stored on the file identifier storing section to the information processing apparatus, and receives the file data identified by the file identifier stored on the file identifier storing section;
a display's display section that displays thereon the file data received by the display's communicating section;
a file data obtaining section that obtains the file data identified by the file identifier transmitted from the display's communicating section, and transmits the obtained file data to the display apparatus;
a file data opening control section that opens the file data obtained by the file data obtaining section to enable the user to edit or view the file data; and
a file data closing control section that closes the file data which has been opened by the file data opening control section to prohibit the user from editing or viewing the file data, when no access is made to the file data which has been opened by the file data opening control section for a predetermined first time period; and
a processing's communicating section that receives the file identifier which is stored on the file identifier storing section and transmitted from the display's communicating section,
wherein the display's communicating section transmits the file identifier stored on the file identifier storing section at intervals of a predetermined second time period only when the display apparatus is positioned within the predetermined range, and
wherein the first file data closing control section closes the file data which has been opened by the first file data opening control section if the processing's communicating section does not receive the file identifier from the display's communicating section for a predetermined third time period which is longer than the second time period.

* * * * *